United States Patent
Ichimura et al.

(10) Patent No.: US 9,443,549 B2
(45) Date of Patent: Sep. 13, 2016

(54) LIBRARY DEVICE AND LIBRARY DEVICE CONTROL METHOD

(71) Applicant: NEC Corporation, Minato-ku, Tokyo (JP)

(72) Inventors: Takahiro Ichimura, Tokyo (JP); Shigeyoshi Hashi, Tokyo (JP); Yoshiyuki Ishii, Tokyo (JP); Wataru Noguchi, Tokyo (JP); Yuuki Hayakawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 98 days.

(21) Appl. No.: 14/142,089

(22) Filed: Dec. 27, 2013

(65) Prior Publication Data

US 2014/0195039 A1    Jul. 10, 2014

(30) Foreign Application Priority Data

Jan. 9, 2013    (JP) .................................. 2013-001986

(51) Int. Cl.
   *G06F 7/00*     (2006.01)
   *G11B 15/68*    (2006.01)

(52) U.S. Cl.
   CPC .................... *G11B 15/689* (2013.01)

(58) Field of Classification Search
   USPC ....................................................... 700/214
   See application file for complete search history.

(56) References Cited

U.S. PATENT DOCUMENTS

| 6,338,006 B1 * | 1/2002 | Jesionowski ......... G06F 3/0605 700/214 |
| 2005/0013149 A1 | 1/2005 | Trossell |
| 2007/0022240 A1 * | 1/2007 | Gallo ...................... G06F 3/061 711/4 |
| 2010/0017018 A1 * | 1/2010 | Morino .................... G07D 7/18 700/223 |

FOREIGN PATENT DOCUMENTS

| JP | H03256259 A | 11/1991 |
| JP | H04155649 A | 5/1992 |
| JP | H08167217 A | 6/1996 |
| JP | 2004014045 A | 1/2004 |
| JP | 3630408 B2 | 3/2005 |
| JP | 2005-122843 A | 5/2005 |
| JP | 2011-95812 A | 5/2011 |
| WO | 9803920 A1 | 1/1998 |

OTHER PUBLICATIONS

Japanese Office Action for JP Application No. 2013-001986 mailed on Dec. 2, 2014 with English Translation.

* cited by examiner

*Primary Examiner* — Kyle Logan

(57) ABSTRACT

A control unit refers to a logical library information storage unit in response to a reception of an export process command from an external device, identifies one of the logical library units which is correlated with a physical recording medium in a physical library unit which has been ordered by the export process command to been ejected from an ejection slot, and correlates, in the identified logical library unit, the ejection slot to a logical recording medium which is correlated to the physical recording medium which has been ordered to been ejected.

10 Claims, 16 Drawing Sheets

| LOGICAL LIBRARY NUMBER | PORT NUMBER | TARGET ID | LOGICAL UNIT NUMBER (LUN) |
|---|---|---|---|
| LOGICAL LIBRARY #0 | 0 | 1 | 0 |
| LOGICAL LIBRARY #1 | 1 | 1 | 0 |

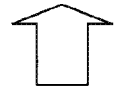

| LOGICAL LIBRARY NUMBER | LOGICAL SLOT NUMBER | PHYSICAL SLOT NUMBER |
|---|---|---|
| LOGICAL LIBRARY #0 | SLOT#0 | SLOT#0 |
| | SLOT#1 | SLOT#1 |
| | SLOT#2 | SLOT#2 |
| | SLOT#3 | SLOT#3 |
| | DRIVE#0 | — |
| | LOGICAL EJECTION SLOT | |
| LOGICAL LIBRARY #1 | SLOT#0 | SLOT#4 |
| | SLOT#1 | SLOT#5 |
| | SLOT#2 | SLOT#6 |
| | SLOT#3 | SLOT#7 |
| | DRIVE#0 | DRIVE#1 |
| | LOGICAL EJECTION SLOT | |

| LOGICAL LIBRARY NUMBER | LOGICAL SLOT NUMBER | PHYSICAL SLOT NUMBER |
|---|---|---|
| LOGICAL LIBRARY #0 | SLOT#0 | SLOT#0 |
| | SLOT#1 | SLOT#1 |
| | SLOT#2 | — |
| | SLOT#3 | SLOT#3 |
| | DRIVE#0 | DRIVE#0 |
| | LOGICAL EJECTION SLOT | SLOT#2 |
| LOGICAL LIBRARY #1 | SLOT#0 | SLOT#4 |
| | SLOT#1 | SLOT#5 |
| | SLOT#2 | SLOT#6 |
| | SLOT#3 | SLOT#7 |
| | DRIVE#0 | DRIVE#1 |
| | LOGICAL EJECTION SLOT | — |

LIBRARY DEVICE AND LIBRARY DEVICE CONTROL METHOD

This application is based upon and claims the benefit of priority from Japanese Patent Application No. 2013-001986, filed on Jan. 9, 2013, the disclosure of which is incorporated herein in its entirety by reference.

TECHNICAL FIELD

The present invention relates to a library device and a library device control method and, in particular, relates to a library device which can be shared by a plurality of external devices (such as computers), and to a control method and a control program thereof.

BACKGROUND ART

In recent years, the amount of data (information) used in executing businesses or the like at enterprises and used in services required for the social life have been increasing. Accordingly, a storage device which is capable of storing such large amount of data and of utilizing the stored data at right time is demanded, for example, at server rooms, data centers and the like.

As an example of such a storage device which includes a plurality of portable cartridges (recording media) is known, wherein each of them contains a recording medium such as a magnetic tape (for details of such library device, refer to Japanese Patent Publication No. 3630408).

In the library device, a recording medium specified by a command which is received from another external device such as a server device (referred to a "server device" as a representative example in the following description) is conveyed to a drive device by the use of a conveyance mechanism. The drive device writes data into the conveyed recording medium or reads data from the recording medium, and thereby exchanges those pieces of data with the server device.

For example, the library device can be shared by a plurality of server devices.

When sharing the library device, such a plurality of server devices communicate with each other using a communication network (hereafter, referred to also as simply a "network") in order to avoid a situation where accesses compete with each other (hereafter, the situation is referred to also as simply "access contention").

As a result, communication traffic between the plurality of server devices increases, and processing load of each server device increases in association with it. Additionally, if one of the server devices is forced to wait as a result of the above-described avoidance of access contention between the server devices, availability of the server is lowered.

In order to deal with such a situation, in a library device shared by a plurality of server devices, a plurality of recording media included in the library device are generally divided into some groups of which includes a predetermined number of medium storage slot so that the process for avoiding access contention does not need to be performed between the server devices. Accordingly, a plurality of physical libraries is created.

In the library device, the logical libraries are correlated on a one-to-one basis with the above-described physical libraries each of which included of the predetermined number of medium storage slot, and the plurality of server devices are correlated on a one-to-one basis with the logical libraries.

Because the library devices have the above-described configuration, it becomes possible to make the situation that each of the server devices have an own library device and can exclusively use the own library device.

Japanese Patent Application Laid-Open No. 2005-122843 discloses a technology of dividing physical libraries included in a library device into a plurality of logical libraries and performing data which is transferred between server devices which are correlated on a one-to-one basis with the plurality of logical libraries which is created by the division.

Specifically, a library device, which is described in Japanese Patent Application Laid-Open No. 2005-122843 notifies, in its inside, insertion of a recording medium to a host which is the destination of data transfer, and makes the host which is the destination of data transfer recognize the inserted recording medium. In this way, Japanese Patent Application Laid-Open No. 2005-122843 discloses a technology for transferring data between hosts in a shorter time than for transferring the data by once ejecting a recording medium outside and inserting it again.

Japanese Patent Application Laid-Open No. 2011-095812 discloses a technology of performing a process described below when a logical volume recorded in a primary storage means (a disk array device) is copied to a recording medium for secondary storage (a tape library device). The process is that, when a target logical volume is a volume which is ejected outside on the basis of ejection identification information, the volume which is ejected outside is copied to a recording medium for external ejection in parallel with the process of copying the logical volume to a recording medium for secondary storage.

Specifically, there is a problem that, when an ejection request is received from a host, it takes a long time since the reception until all logical volumes designated are copied to a recording medium for secondary storage and ejection of the recording medium for secondary storage after the copying becomes possible. With regard to the problem, Japanese Patent Application Laid-Open No. 2011-095812 discloses a technology which can perform the ejection in a short time by creating a recording medium for external ejection in parallel with copying to a recording medium for secondary storage.

However, the library device mentioned above has a problem described below.

In the library device mentioned above, a recording medium is required for recording new data into it. It is also required to backup data recorded in a recording medium or to store data in a recording medium for a long period of time. Because of these sorts of necessity, operations of inserting the recording medium into the library device from outside and of extracting (ejecting) it from the library device are performed. These operations are usually performed, for example, at a closure of a business or the like, and hence are not frequently performed.

Therefore, in the library device, for example, the number of physical slots from which a recording medium is ejected (ejection slot) is not so large as the number of server devices using the library device (that is, the number of logical libraries created by the division and correlated with the server devices as described above). Accordingly, the physical ejection slots are shared by a plurality of server devices.

Here, the ejection slots are referred to as physical slots within the library device which are used, for example, by an operator to extract a recording medium into which the library device has recorded data, via an extraction opening from which a recording medium can be extracted, in order to eject the recording medium outside the library device for the purpose of, for example, long-term storage of the recording medium at another place. The ejection slots may be able to contain a plurality of recording media.

An application program executed at a server device so as to control the library device issues an instruction (ejection request) to cause the library device to eject a recording medium desired to be ejected, among recording media which are stored in the physical slot constituting a physical library correlated with a logical library related to the server device, to the ejection slots. Here, there may be a case a plurality of server devices each issue such an ejection request simultaneously with the others.

When ejection requests are issued simultaneously from a plurality of applications, as mentioned above, and the shared ejection slots can contain a plurality of recording media, for example, recording media ejected in accordance with the respective ejection requests, each from among recording media which are stored in the physical slot constituting a physical library correlated with a logical library related to the corresponding server device. Therefore, the recording media are mingled with each other at the ejection slots.

Accordingly, there arises a problem in that an operator needs to sort the ejected recording media to identify which logical library is correlated with, and it takes a lot of trouble.

In the library device having the shared ejection slots, until completion of extracting a recording medium from a logical ejection slot assigned to a logical library, no other logical libraries accept a request for ejecting a recording medium. Accordingly, there arises a problem in that server devices controlling the other logical libraries are forced to suspend issuing a request for ejecting a recording medium.

Japanese Patent Application Laid-Open No. 2005-122843 mentioned above gives no consideration for ejecting a recording medium to the outside of the library device. Therefore, the disclosure of Japanese Patent Application Laid-Open No. 2005-122843 is limited to a technology of, in transferring data by correlating a tape recording medium with a different logical library within a library device having a plurality of logical libraries created by the division described above, determining a logical library whose related tape recording medium is not ejected to be a target logical library to which the data is to be transferred.

In the technology disclosed in Japanese Patent Application Laid-Open No. 2011-095812 mentioned above, for example, a plurality of hard disk drives included in a disk array device being a primary storage means are divided into groups each consisting of a predetermined number of hard disk drives, and each of the groups of hard disk drives is correlated with a logical library. However, Japanese Patent Application Laid-Open No. 2011-095812 discloses nothing about correlating the logical libraries, already correlated with the hard disk drive groups, on a one-to-one basis with a plurality of server devices.

SUMMARY

An example of an object of the invention is to provide a library device and a control method thereof which solve the problems described above.

In order to achieve the object, the present invention has the following characteristics.

A library device according to an exemplary aspect of the invention includes at least an ejection slot which is shared by a plurality of external devices, and a physical library unit which contains a plurality of physical recording media and is divided into a larger number of areas than the number of the ejection slots, and logical library units each of which contains a plurality of logical recording media and are logically correlated with each of the areas, and a logical library information storage unit which stores connection information indicating a connection relationship between each of the logical library units and each of the external devices, and a control unit which correlates the recording medium with the logical library units when each of the physical recording media are ejected. The control unit refers to the logical library information storage unit in response to a reception of an export process command from the external device, identifies one of the logical library units which is correlated with a physical recording medium in the physical library unit which has been ordered by the export process command to been ejected from the ejection slot, and correlates, in the identified logical library unit, the ejection slot to a logical recording medium which is correlated to the physical recording medium which has been ordered to been ejected.

A library device control method according to an exemplary aspect of the invention, which is used in a library device, which includes at least an ejection slot which is shared by a plurality of external devices, and a physical library unit which contains a plurality of physical recording media and is divided into a larger number of areas than the number of the ejection slots, and logical library units each of which contains a plurality of logical recording media and are logically correlated with each of the areas, and a logical library information storage unit which stores connection information indicating a connection relationship between each of the logical library units and each of the external devices, and a control unit which correlates the recording medium with the logical library units when each of the physical recording media are ejected, includes referring to the logical library information storage unit in response to a reception of an export process command from the external device, and identifying one of the logical library units which is correlated with a physical recording medium in the physical library unit which has been ordered by the export process command to been ejected from the ejection slot, and correlating, in the identified logical library unit, the ejection slot to a logical recording medium which is correlated to the physical recording medium which has been ordered to been ejected.

A non-transitory recording computer readable medium for storing a control program according to an exemplary aspect of the invention, which is used in a library device which includes, at least an ejection slot which is shared by a plurality of external devices, and a physical library unit which contains a plurality of physical recording media and is divided into a larger number of areas than the number of said ejection slots, and logical library units each of which contains a plurality of logical recording media and are logically correlated with each of said areas, and a logical library information storage unit which stores connection information indicating a connection relationship between each of said logical library units and each of said external devices, and a control unit which correlates the recording medium with said logical library units when each of said physical recording media are ejected, which makes a computer execute a referring processing in which refers to said logical library information storage unit in response to a reception of an export process command from said external device, and an identifying processing in which identifies one of said logical library units which is correlated with a physical recording medium in said physical library unit which has been ordered by said export process command to been ejected from said ejection slot, and a correlating processing in which correlates, in the identified logical library unit, said ejection slot to a logical recording medium which is correlated to said physical recording medium which has been ordered to been ejected.

BRIEF DESCRIPTION OF THE DRAWINGS

Exemplary features and advantages of the present invention will become apparent from the following detailed description when taken with the accompanying drawings in which:

FIG. 5 is a table showing an example of a result of updating a logical library configuration information table which is performed when ejecting a recording medium on the basis of an export process command from an external device, in library devices in the second and third exemplary embodiments of the present invention.

EXEMPLARY EMBODIMENT

Exemplary embodiments of the present invention will be described in detail with reference to drawings.

Figure 1:
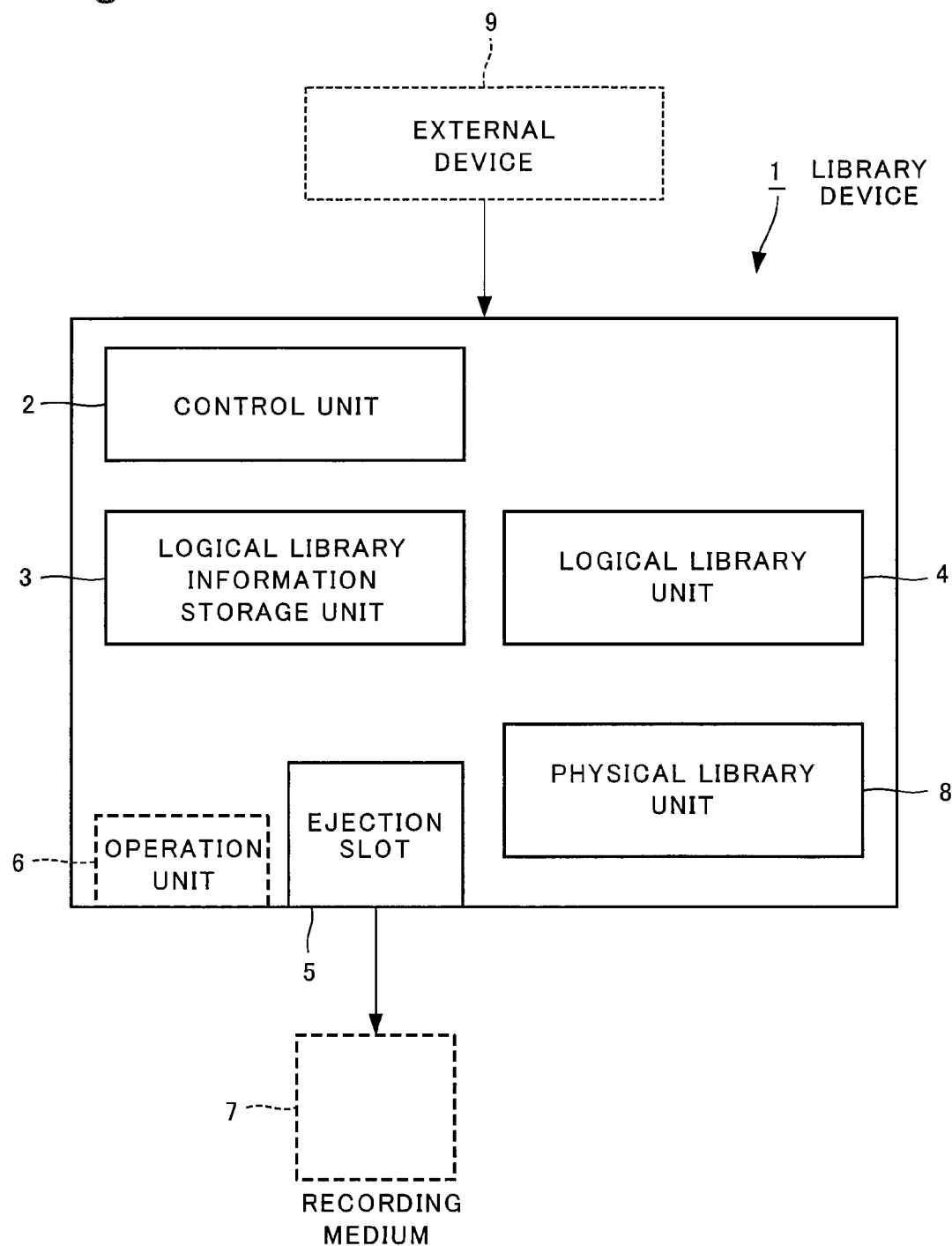
FIG. 1 is a block diagram showing a first exemplary embodiment of the present invention.

Referring to FIG. 1, the present exemplary embodiment includes a library device 1, a recording medium 7 and a plurality of external devices 9.

The library device 1 includes a control unit 2, a logical library information storage unit 3 for storing information about logical libraries, a logical library unit 4, an ejection slot 5 and a physical library unit 8.

The recording medium 7 records a plurality of pieces of data. A computer can record those pieces of data. The recording medium 7 is ejected from the ejection slot 5.

The physical library unit 8 is a data storage device equipped with a plurality of recording media 7. The physical library unit 8 can divide recording media 7 into groups, wherein the groups include a predetermined number of the recording media 7. Each of these groups of a predetermined number of the recording media 7 is named "physical sub-library (not illustrated)".

Then, a plurality of physical sub-libraries are correlated on a one-to-one basis with a plurality of logical sub-libraries (not illustrated) created by dividing the logical library unit 4 which is a logical storage area.

The plurality of external devices 9 are connected on a one-to-one basis with the plurality of logical sub-libraries described above, and order an export process. The export process is an operation of ejecting, from the ejection slot 5, a recording medium 7 in the physical sub-libraries correlated on a one-to-one basis with the plurality of logical sub-libraries. The number of the ejection slots 5 is one or larger, and the ejection slots 5 are shared by a larger number of external devices 9 than the ejection slots 5.

An operation unit 6 is used by an operator (not illustrated), who extracts the recording medium 7 to the outside of the library device 1, to designate a logical library unit 4 (logical sub-library) to which the recording medium 7 to be extracted is correlated.

That is, the library device 1 includes at least one ejection slot 5 which is shared by the plurality of external devices 9, and the physical library unit 8 which contains the plurality of physical recording media 7 and is divided into a larger number of areas than that of the ejection slots 5. The library device 1 also includes the logical library units 4 (logical sub-libraries) which are correlated with the respective areas, and the logical library information storage unit 3 which stores information representing a connection relationship between the logical library units 4 and the external devices 9. Further, the library device 1 includes the control unit 2 which controls the physical recording medium 7 to correlate to the logical library unit 4 in case of ejecting the physical recording medium 7.

The control unit 2 refers to the logical library information storage unit 3 in response to a reception of an export process command from an external device 9. Accordingly, the control unit 2 identifies the logical library unit 4 to which the physical recording medium 7, stored in the physical library unit 8, whose ejection from the ejection slots 5 has been ordered by the export process command.

Then, the control unit 2 correlates the physical recording medium 7 whose ejection has been ordered with the logical ejection slot, in the logical library unit 4.

As a result, the present exemplary embodiment has an effect that it becomes possible to eject, to the ejection slot, only the recording medium stored in the physical library correlated with the logical library which the external device 9 intends to eject.

It is because: the external device 9 issues an order of the export process; according to the order, the logical library unit 4 is identified; only the recording medium 7 stored in the physical library correlated with the specified logical library unit 4 is ejected to the ejection slot 5; and any recording medium 7 correlated with the logical library unit 4 not specified by the external device 9 through the above-described order is not ejected to the ejection slot 5.

The above description has been given of a configuration in which the physical library unit 8 is divided into a larger number of areas than the number of accessible ejection slots held by the ejection slot 5, and the area created by the division represent respective ones of the logical library units 4. Here, "divide" can be regarded, if regarding a plurality of recording media 7 existing physically as a large set, for example, as making the large set into a collection of a plurality of small sets (in other words, separating into groups, grouping or partitioning).

Next, a second exemplary embodiment based on the first exemplary embodiment will be described with reference to FIGS. 2, 4 and 5.

Figure 2:
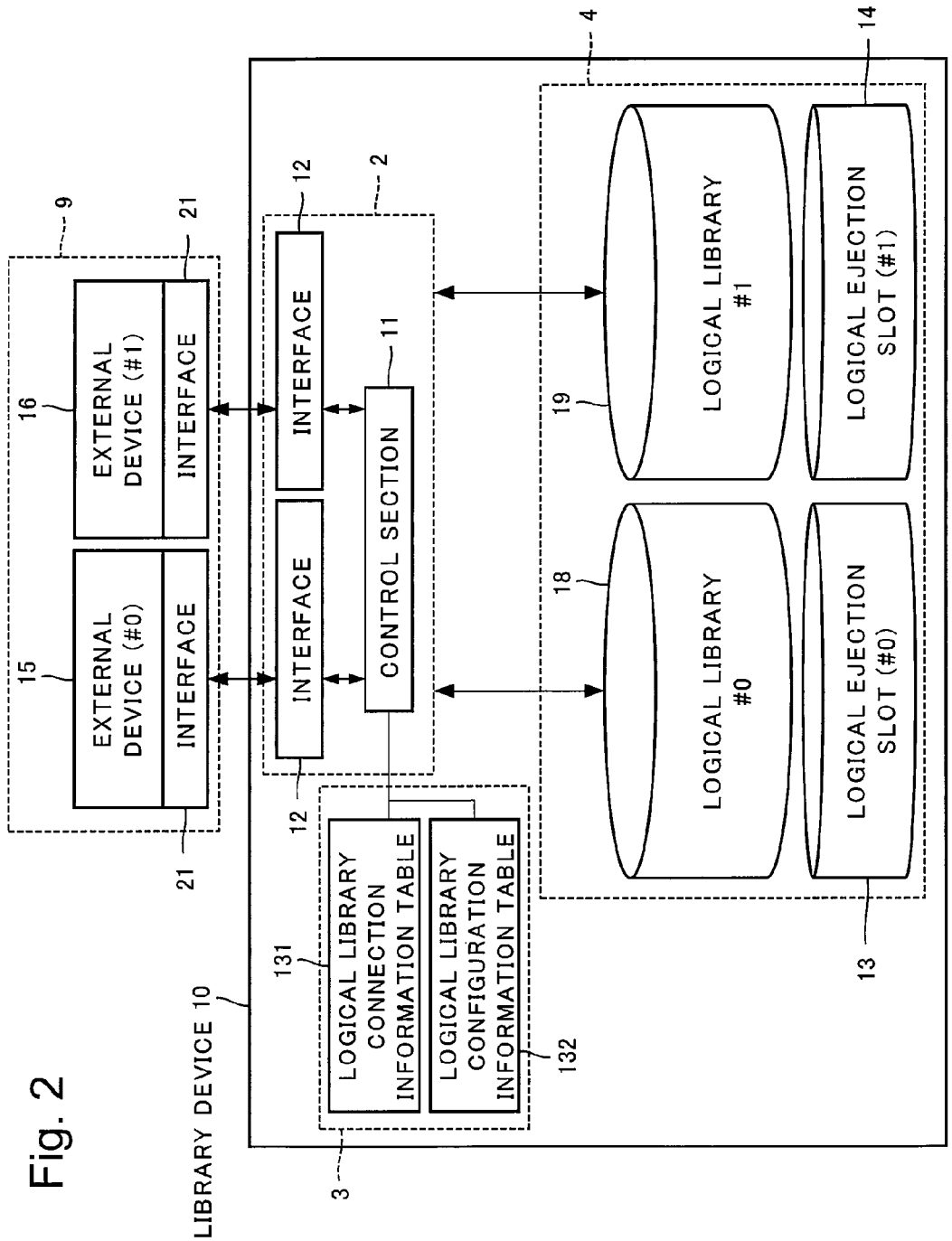
FIG. 2 is a block diagram showing a second exemplary embodiment of the present invention.

FIG. 2 is a block diagram showing the second exemplary embodiment.

Here, the following description will be given mainly of characteristic portions in the present exemplary embodiment and, to the same constituent elements in the present exemplary embodiment as that in the above-described first exemplary embodiment, the respective same signs are given, and duplicated descriptions of such constituent elements will be omitted.

Referring to FIG. 2, the present exemplary embodiment is composed of the external device 9 and a library device 10.

The library device 10 includes the control unit 2, the logical library information storage unit 3 and the logical library units 4. The library device 10 is connected with the external device 9 in a manner to enable mutual communication.

Here, the control unit 2 includes a control section 11 and interfaces 12. The logical library information storage unit 3 includes a logical library connection information table 131 and a logical library configuration information table 132.

The logical library connection information table 131 is a table for determining a logical library unit 4 to which a connection is to be made on the basis of a command given by the external device 9.

The logical library configuration information table 132 is a table representing a relationship between the logical library units 4 and the physical library unit 8 (not illustrated in FIG. 2).

The logical library units 4 include a logical library (#0) 18 and a logical library (#1) 19, and also a logical ejection slot (#0) 13 and a logical ejection slot (#1) 14, which are virtual (logical) ejection slots correlated on a one-to-one basis with the logical library (#0) 18 and the logical library (#1) 19, respectively.

The external device 9 includes an external device (#0) 15 and an external device (#1) 16. The external device (#0) 15 and the external device (#1) 16 each include an interface 21.

Here, the external device (#0) 15 and the external device (#1) 16 in the present exemplary embodiment correspond to the external devices 9 described in the first exemplary embodiment. The control section 11 and the interfaces 12 collectively correspond to the control unit 2 in the first exemplary embodiment. The logical library (#0) 18, the logical library (#1) 19, the logical ejection slot (#0) 13 and the logical ejection slot (#1) 14 collectively correspond to the logical library unit 4 in the first exemplary embodiment.

When discriminating between respective ones of a plurality of logical libraries and between respective ones of a plurality of external devices, signs such as (#0) and (#1) representing numbers of the respective ones may be used. When collectively referring to a plurality of logical libraries and a plurality of external devices, they may be referred to as the logical library unit 4 and the external device 9, respectively.

Although the logical library connection information table 131 and the logical library configuration information table 132 are referred to as tables, they may be regarded as information.

Figure 4:
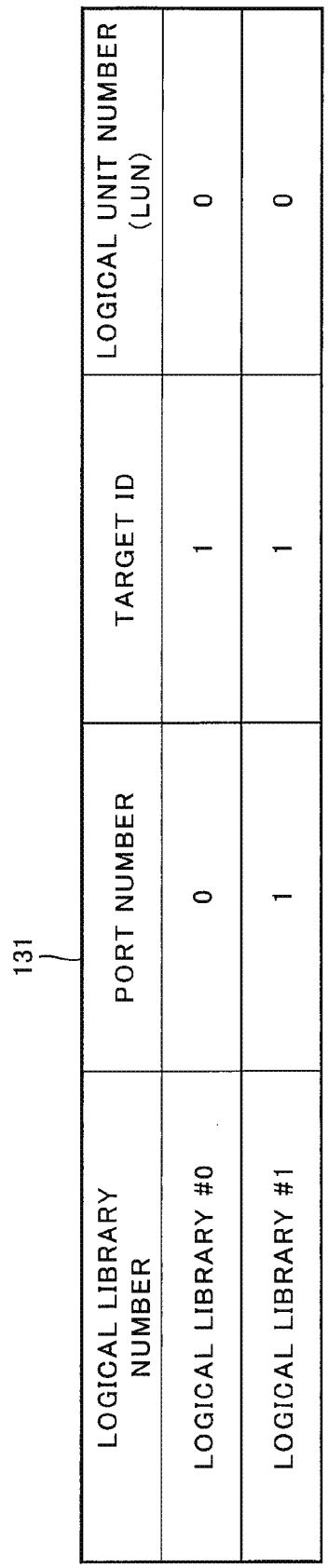
FIG. 4 is a table conceptually showing a logical library connection information table used in library devices in the second and third exemplary embodiments of the present invention.

Next, FIG. 4 is a table conceptually illustrating the logical library connection information table 131 used in the library device 10 in the present exemplary embodiment.

The connection information stored in the logical library information storage unit 3 described in the first exemplary embodiment may be regarded as, for example, information represented by the logical library connection information table 131.

The control section 11 receives a command given by the external device 9 via the interfaces 12. The command given by the external device 9 is, for example, an export process command which gives the library device 10 an order for an export process of causing the library device 10 to eject the recording medium 7 (not illustrated in FIGS. 2 and 4).

Receiving the command, the control section 11 refers to the logical library connection information table 131 shown in FIG. 4, and thereby determines with respect to which one of the logical libraries 18 and 19 the external device 9 is ordering the export process.

More specifically, the logical library connection information table 131 shown in FIG. 4 has a logical library number column showing logical libraries created by logical division, a port number column showing port numbers representing the ports provided in the interfaces 12, which accept a command from the external device 9, a target ID column showing target IDs (abbreviation of "IDentifications"; hereafter, also referred to as "identifiers") for discriminating between the logical libraries 18 and 19 which are logically connected to the ports, and a logical unit number column showing logical unit numbers (also referred to as "LUNs") held by the logical libraries 18 and 19.

Then, the logical library connection information table 131 is used, through the use of those numbers and identifiers, for identifying logical library numbers representing the logical library (#0) 18 and the logical library (#1) 19, to which the external devices 15 and 16 are correlated and connected on a one-to-one basis.

For example, when, in connection information included in a command given to the library device 10, a port number is "0", a target ID is "1" and an LUN is "0", the external device 9 can thereby specify the logical library (#0) 18 whose logical library number is #0.

Further, the library device 10 in the present exemplary embodiment updates the logical library configuration information table 132 when having ejected the recording medium 7 in accordance with an export process command from the external device 9. FIG. 5 shows an example of a result of such update.

The left table in FIG. 5 represents a state of the logical library configuration information table 132 before reception of the export process command. The right table in FIG. 5 represents a state of the logical library configuration information table 132 after the reception of the export process command.

In the logical library configuration information table 132, the first column is a logical library number column showing logical library numbers to be identified by the use of the logical library connection information table 131 described above.

In the logical library configuration information table 132, the second column is a logical slot number column showing the numbers of logical slots constituting the each logical library.

In the logical library configuration information table 132, the third column is a physical slot number column showing numbers of physical slots which physically store recording media 7 (not illustrated in FIG. 2), in the physical library unit 8, correlated on a one-to-one basis with the logical slot numbers.

Then, the logical library configuration information table 132 before the reception of the export process command, shown in the left area of FIG. 5, includes slots #0 to #3, a drive #0 and a logical ejection slot in its logical slot number column. Its physical slot number column includes slots #0 to #3 and a drive #0, and has a sign "-" indicating that the slot is an empty one which is correlated to no recording medium 7 in the field corresponding to the logical ejection slot.

For example, using FIGS. 2, 4 and 5, a description will be given of operation, in the fields for the logical library #0 in the logical library configuration information table 132 before the reception of the export process command shown in the left area of FIG. 5, of virtually moving the recording medium 7 correlated with the slot #2 in the physical slot number column to a physical slot number field whose logical slot number field is correlated with the logical ejection slot (that is, to the location represented by "-").

The external device 9 orders an export process whose content is to move the recording medium 7, stored in the physical library unit 8, whose physical slot number field is correlated with the slot #2 to the ejection slot 5.

In response to the order, the control section 11 refers to the logical library configuration information table 132 shown in the left area of FIG. 5, and accordingly moves the slot #2 (hereafter, referred to as "physical slot #2") in the physical slot number column to the location represented by "-" in the physical slot number column which corresponds to the logical ejection slot in the logical slot number column. Then, the sign "-" in the physical slot number column corresponding to the logical ejection slot in the logical slot number column is moved to the original location of the slot #2 in the physical slot number column.

Subsequently, in association with the movement described above, the control section 11 updates the contents of the logical library configuration information table 132 to that of after the reception of the export process command, which is shown in the right area of FIG. 5.

In this way, the control section 11 can make the situation appear to the external device 9 as if the recording medium 7 stored into the physical slot #2 correlated with the logical slot #2 has been moved to the ejection slot 5 (not illustrated in FIG. 2).

In other words, based on the movement of a recording medium which is stored in the physical slot which is correlated with a slot #2 in the logical slot number column (hereafter, referred to as "logical slot #2", not illustrated in FIG. 2) and is correlated with the physical slot #2 from the logical library (#0) 18 to the logical ejection slot (#0) 13, shown in FIG. 2, the control section 11 reports to the external device 9 that the recording medium 7 correlated with the physical slot #2 has been ejected to the ejection slot 5.

That is, the library device 10 in the present exemplary embodiment can logically move to a logical ejection slot a logical recording medium correlated with a recording medium 7 whose ejection has been ordered by any one of the external devices 15 and 16.

Accordingly, the present exemplary embodiment has an effect of being efficient because of the fact that, even when ejection of a recording medium 7 based on an export process command issued from either one of the external devices 15 and 16 has not been completed, another export process command issued from the other external device can be accepted.

It is because, in response to an export process command from any one of the external devices, a physical recording medium 7 whose ejection has been ordered is virtually moved to a logical ejection slot which is comprised in each of the logical libraries correlated on a one-to-one basis with the respective external devices.

Next, a third exemplary embodiment based on the first and second exemplary embodiments will be described with reference to FIGS. 3 to 7.

Figure 3:
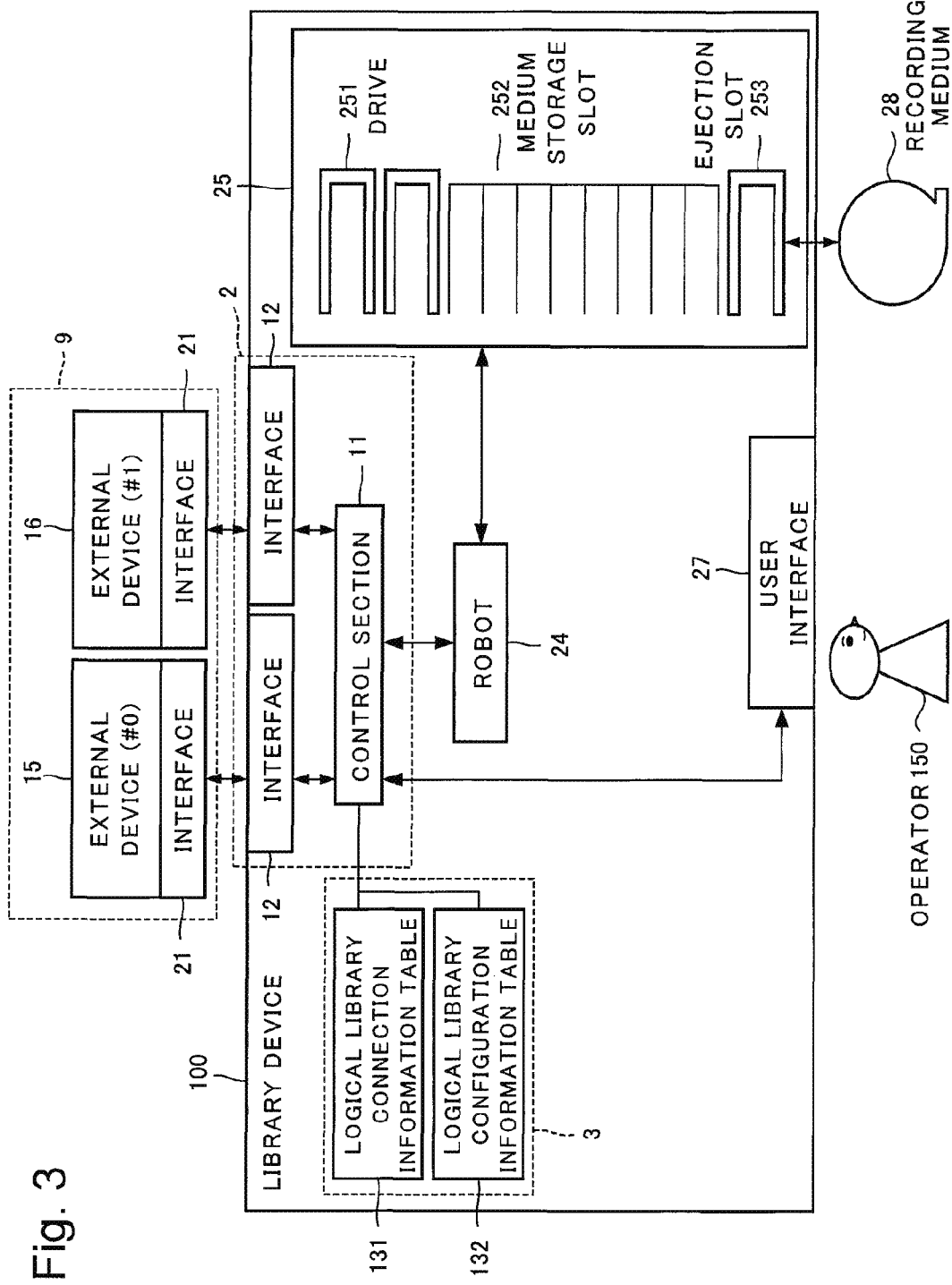
FIG. 3 is a block diagram showing a third exemplary embodiment of the present invention.

FIG. 3 is a block diagram showing the third exemplary embodiment.

Referring to FIG. 3, the present exemplary embodiment (the third exemplary embodiment) is composed of a library device 100 and the external device 9.

The library device 100 of the present exemplary embodiment differs in configuration from the library devices of the first and second exemplary embodiments in that it further includes a robot (conveying device) 24, a slot unit 25 and a user interface 27 (hereafter, also referred to as a "UI 27").

Accordingly, the following description will be given mainly of characteristic portions in the present exemplary embodiment and, to the same constituent elements in the present exemplary embodiment as that in the above-described first and second exemplary embodiments, the respective same signs are given, and duplicated descriptions of such constituent elements will be omitted.

Here, the control section 11 and the interfaces 12 in the present exemplary embodiment collectively correspond to the control unit 2 in the first exemplary embodiment. The slot unit 25 including an ejection slot 253 in the present exemplary embodiment collectively corresponds to the ejection slot 5 and the physical library unit 8. The UI 27 in the present exemplary embodiment collectively corresponds to the operation unit 6.

The logical library information storage unit 3 includes the logical library connection information table 131 (FIG. 4) and the logical library configuration information table 132 (FIG. 5). Since the logical library connection information table 131 and the logical library configuration information table 132 have been already described in the second exemplary embodiment, their descriptions will be omitted here.

The slot unit 25 includes drives 251, medium storage slots 252 and the ejection slot 253.

The drives 251 read and write data to conveyed recording media 28 into the external device 9 via the control section 11.

The medium storage slots 252 are physical slots capable of containing a plurality of recording media 28, and are correlated with physical slot number fields in the logical library configuration information table 132.

The ejection slot 253 is a slot which includes at least one slot element, can contain the recording medium 28, and is capable of extracting the recording medium 28 to the outside of the library device 100 by opening it.

The ejection slot 253 can contain one or more recording media 28.

In the present exemplary embodiment, for convenience of explanation, the following description will be given of a case where the ejection slot 253 has only one slot element, for example.

Because the ejection slot 253 is ordered to do export processes by a plurality of external devices, the ejection slot 253 may be referred to as a "shared ejection slot" 253 (the same shall apply hereafter).

As described in the first and second exemplary embodiments, it is premised that the number of logical libraries divided (grouped) into groups described in the first exemplary embodiment, is larger than the number of slot elements of the ejection slot 253.

It is also assumed that, for expressing individual logical libraries in the logical library unit 4 created by logically dividing the logical library unit 4, each of the logical libraries is referred to simply as a logical library.

The robot 24 ejects the recording medium 28 stored in the slot unit 25 to the outside of the library device 100 via the ejection slot 253 and, conveys (moves) the recording medium 28 between a drive 251 and a physical slot being a medium storage slot 252 within the slot unit 25.

Here, for collectively expressing physical slots including the drives 251, the medium storage slots 252 and the ejection slot 253 in the physical library unit 8, they are referred to as a slot unit 25. For expressing solely individual physical slots to contain the recording medium 28, they each may be referred to as the medium storage slot 252.

The UI 27 is an operation unit which an operator 150, described later, can operate when the operator 150 ejects the recording medium 28 correlated with a logical ejection slot to the ejection slot 253. For example, the UI 27 includes an entry unit and a display unit, which are not illustrated in FIG. 3. The display unit displays, for example, a plurality of logical libraries created by the above-described grouping in the logical library unit 4 by the use of a liquid crystal display. From among the plurality of logical libraries displayed, for example, the operator 150 can select (designate) a logical library with which the recording medium 28 desired to be ejected is correlated, using buttons or the like at the entry unit.

For example, by designating a position representing the logical library (#0) 18 displayed on the display unit using a button or the like, the operator 150 can make ejected the recording medium 28 correlated with the logical ejection slot (#0) 13 which is included in the logical library (#0) 18 to the ejection slot 253, using the UI 27.

For the purpose of extracting the recording medium 28 stored in (ejected to) the ejection slot 253, the operator 150 can open the ejection slot 253 from the outside of the library device 100.

An application program (abbreviated as "AP", hereafter) operating in the external device 9 issues a command to control the library device 100 connected via the interfaces 21 and 12, and orders the library device 100 to execute a process according to the command.

In response to its reception of the command ordered by the external device 9, the library device 100 executes processes such as of conveying (ejecting or moving) the recording medium 28 stored in the slot unit 25 using the robot 24 and acquiring information about the recording medium 28 (such as the name of the recording medium 28, for example).

As already described above, by only designating the logical library number (#0) to which the recording medium 28 whose ejection is desired by the external device 9 is correlated, the operator 150 can make ejected the recording medium 28 which is correlated to the logical ejection slot and stored in the medium storage slot 252, for example, to the ejection slot 253. Then, the library device 100 notifies the external device 9 of the result.

In the slot unit 25 shown in FIG. 3, the library device 100 further includes an insertion slot or the like (not illustrated in FIG. 3) for inserting (charging) the recording medium 28 into the library device 100 from the outside. The ejection slot 253 may function also as such an insertion slot. However, in the present exemplary embodiment, descriptions will be given of a case where the ejection slot 253 has merely a function to eject the recording medium 28.

Next, with respect to the library device 100 in the present exemplary embodiment, a description will be given of a method of ejecting the recording medium 28 stored in the medium storage slot 252, as an example, using the block diagram and tables shown in FIGS. 3 to 5 and flow charts shown in FIGS. 6 and 7.

Figure 6:
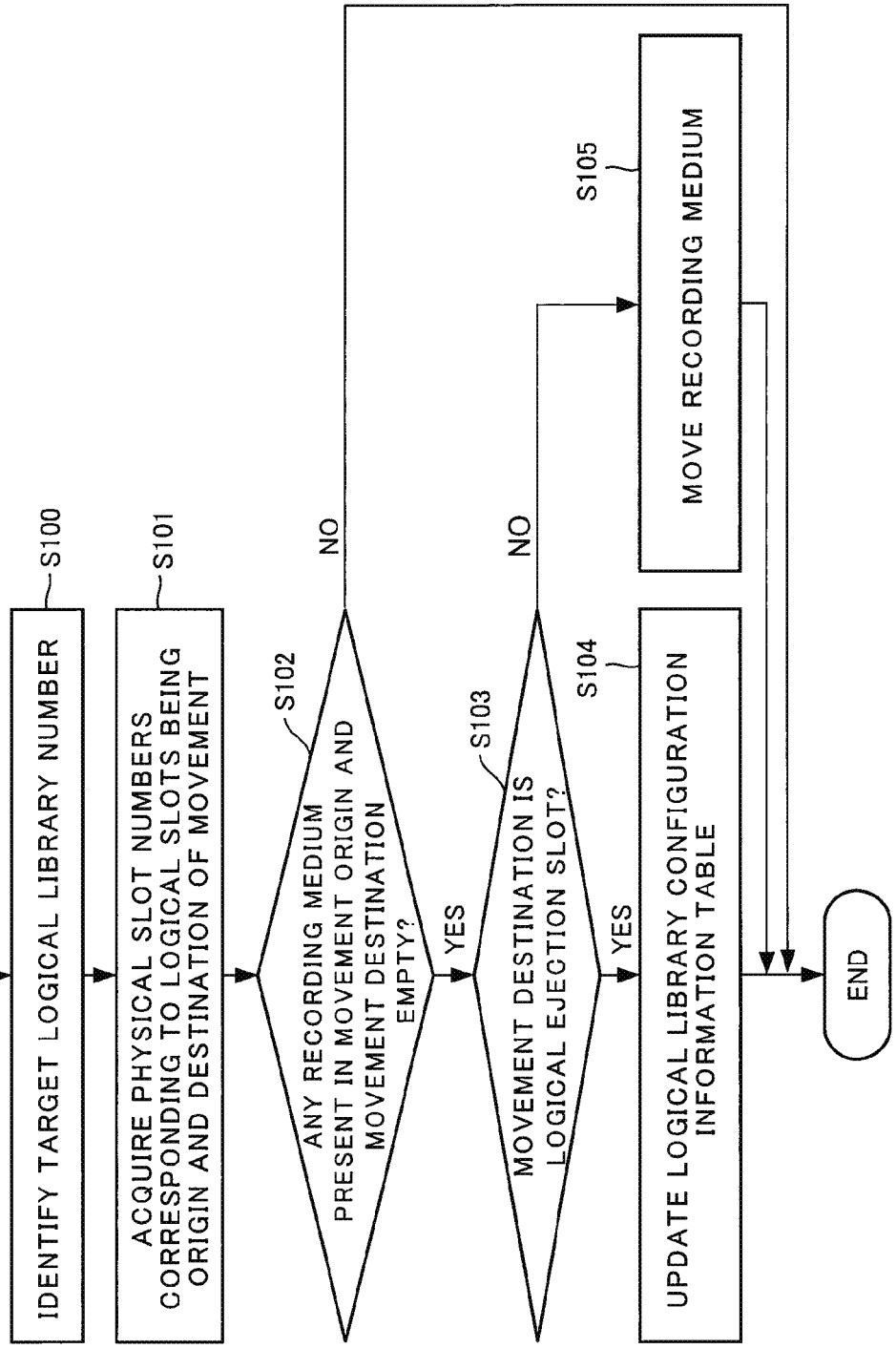
FIG. 6 is a flow chart illustrating a medium movement process performed on receiving from an external device a medium movement process command for ordering movement including ejection of a recording medium, in a library device in the third exemplary embodiment of the present invention.

FIG. 6 is a flow chart illustrating a medium movement process performed in the library device 100 in the present exemplary embodiment on receiving from the external device 9 a medium movement process command for ordering movement including ejection of the recording medium 28.

Because the flow chart shown in FIG. 6 is not only for an ejection process on the recording medium 28 but also for its movement process, a command ordered by the external device 9 is referred to not as an export process command but as a medium movement process command.

As shown in the flow chart of FIG. 6, on receiving a medium movement process command from an AP operating in the external device 9, the control section 11 refers to the logical library connection information table 131 shown in FIG. 4.

Then, on the basis of a combination of values represented respectively by a port number of the interfaces 12, a target ID and a LUN being a logical unit number, at the time of the reception of the medium movement process command, the control section 11 identifies a logical library number which indicates a logical library, in the logical library unit 4, with respect to which the medium movement process command has been issued (step S100).

Next, the control section 11 refers to the logical library number identified in the step S100 and the logical library configuration information table 132 shown in the left area of FIG. 5. Then, in accordance with the logical library number and the table, the control section 11 acquires physical slot numbers, in the slot unit 25, corresponding respectively to the slot numbers of original and destination slots of the movement which have been received as parameters included in the medium movement process command (not illustrated in FIGS. 5 and 6) (step S101).

For example, with respect to the logical library #0, the control section 11 acquires the physical slot #2 as the physical slot number for the movement origin, and the sign "-" as the physical slot number for the movement destination.

Then, the control section 11 checks that a recording medium 28 is present in the original slot of the movement and no recording medium 28 is present in the destination slot (that is, the slot is empty) (step S102).

Here, as seen in the logical library configuration information table 132 before the reception of the medium movement process command, shown in the left area of FIG. 5, there may be a case where there exists no physical slot number corresponding to a certain logical slot number.

It is premised that, in such a case, the sign "-" is given in the corresponding physical slot number field, and the sign "-" is regarded as expressing a state where no recording medium 28 correlated with the physical slot number field is stored in the slot unit 25, for example.

Then, if no recording medium 28 is stored in the movement origin in the slot unit 25, for example, (NO at the step S102), the control section 11 notifies a code representing a "MEDIUM SOURCE ELEMENT EMPTY" error to the external device 9, (not illustrated in FIG. 6), and ends the medium movement process.

Further, if recording medium 28 is stored in the movement destination in the slot unit 25 (another case of NO at the step S102), the control section 11 notifies a code representing a "MEDIUM DESTINATION ELEMENT FULL" error to the external device 9, (not illustrated in FIG. 6), and ends the medium movement process.

Here, the medium movement process command ordered by the external device 9 and the notification of the "MEDIUM SOURCE ELEMENT EMPTY" and "MEDIUM DESTINATION ELEMENT FULL" errors to be received by the external device 9, which are described above as examples, are described in detail in Small Computer Serial Interface (hereafter, abbreviated as "SCSI") Medium Changer Commands-3 (hereafter, abbreviated as "SMC-3") provided by the INCITS Technical Committee T10 which determines a command standard with respect to the external device 9 for controlling the library device 100.

Accordingly, detail descriptions of the above-mentioned command and notification are omitted here.

INCITS is an abbreviation of the International Committee for Information and Communication Technology Standards. The T10 mentioned above is a technical committee for developing SCSI-related technical standards in INCITS.

Then, if a recording medium 28 is present in the original slot of the movement in the slot unit 25 and the destination physical slot of the movement is empty (YES at the step S102), and the designated movement destination is the logical ejection slot in the logical library (YES at a step S103), the control section 11 executes the medium movement process. The medium movement process does not perform physical movement of a physical recording medium 28, but merely changes the correspondence relationship represented in the physical slot number column of the logical library configuration information table 132 such that the physical slot number for the movement origin and that for the movement destination are exchanged there.

That is, for logically moving a recording medium from the logical slot #2 to the logical ejection slot, in the logical library #0, the control section 11 performs an update of correlating the physical slot #2 presently correlated to the logical slot #2 to the logical ejection slot and further giving the sign "-" to the physical slot number field corresponding to the logical slot #2 (step S104).

As a result, the logical library configuration information table 132 before the reception of the medium ejection process command shown in the left area of FIG. 5 becomes in a state where it has been updated into the logical library configuration information table 132 after the reception of the medium ejection process command shown in the right area of FIG. 5.

When the movement destination is other than the ejection slot 253 (that is, such as the drives 251 or the medium storage slots 252), the control section 11 moves the recording medium 28 stored in the original slot of the movement in the slot unit 25 to the movement destination, which is other than the ejection slot 253 (step S105), and ends the medium movement process.

Then, subsequently to completion of the logical ejection process on the recording medium 28 by the medium movement process described above, the operator 150 designates the logical library with which the recording medium 28 to eject is correlated, using the display unit and the entry unit at the UI 27. After that, it becomes possible for the operator 150 to extract the recording medium 28 having been moved to and stored into the physical ejection slot, which is a physical ejection outlet, from the ejection slot 253, by performing an ejection slot opening operation described below.

Figure 7:
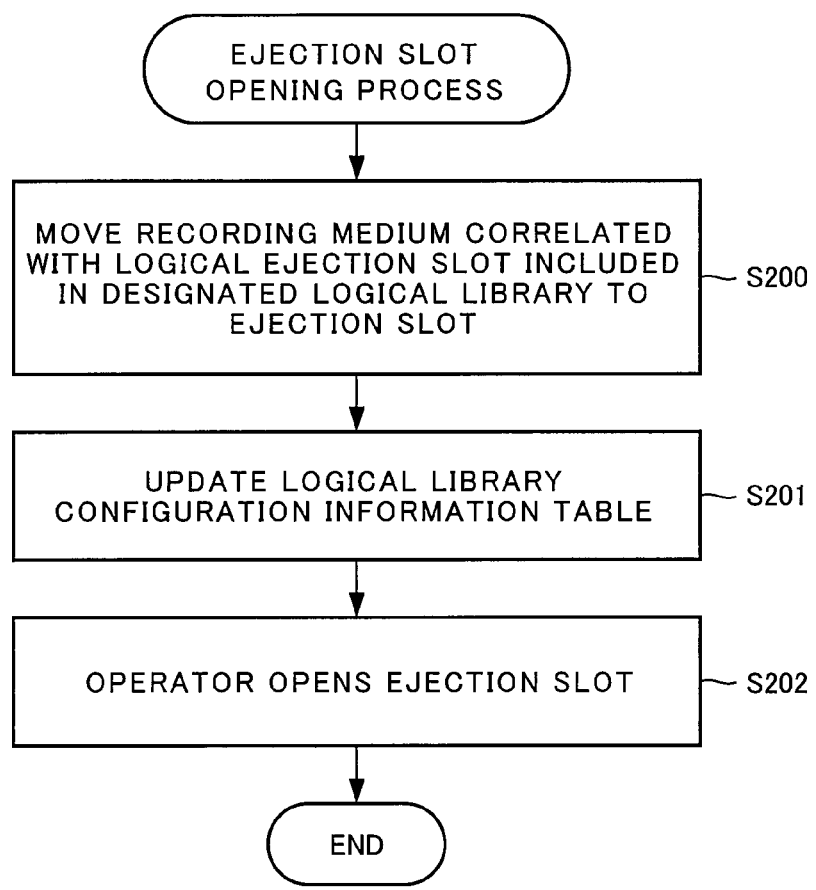
FIG. 7 is a flow chart illustrating an ejection slot opening process in the library device in the third exemplary embodiment of the present.

FIG. 7 shows a flow of the ejection slot opening process performed by the control section 11 when the operator 150 operates the UI 27 to extract the recording medium 28. FIG. 7 is a flow chart illustrating the ejection slot opening process performed in the library device in the present exemplary embodiment.

First, the operator 150 designates the logical library to which the recording medium 28 to extract is correlated, using the UI 27.

Accordingly, the control section 11 refers to the logical library configuration information table 132 shown in FIG. 5, thereby acquires, for example, a physical slot number (the physical slot #2, for example), in the logical library #0, whose logical slot number corresponds to the logical ejection slot. And then, the control section 1 and moves the recording medium 28, stored in a medium storage slot 252, which is represented by the acquired physical slot number, to the ejection slot 253 (step S200).

That is, only after the operator 150 designating the logical library at the UI 27, physical movement of the recording medium 28 becomes possible.

Next, the control section 11 updates the logical library configuration information table 132 (step S201). Thereby, the correspondence relationship between the physical slot number of the movement origin and that of the movement destination, which have been changed in the above-described medium movement process of moving the recording medium 28 to the ejection slot 253, are returned back to its original state.

More specifically, because the physical slot #2 has been already ejected, the control section 11 performs an update of the logical library configuration information table 132 after the reception of the medium ejection process command shown in the left area of FIG. 5, in which the corresponding physical slot numbers have been changed. Thereby, the corresponding physical slot number field is given the sign "-" similarly to in the logical library configuration information table 132 before the reception of the medium ejection process command shown in the right area of FIG. 5.

Then, the operator 150 opens the ejection slot 253 (step S202) and ends the ejection slot opening process. In this way, the operator 150 can extract the recording medium 28 from the ejection slot 253. After extracting the recording medium 28, the operator 150 closes the ejection slot 253.

By executing the above-described medium movement process (FIG. 6) and ejection slot opening process (FIG. 7), the control section 11 in the present library device 100 can eject only a recording medium 28 designated by the external device unit 9 to the outside of the library device 100. The control section 11 can also eject only a recording medium 28, in the slot unit 25, correlated with a logical library designated by the operator 150, to the outside of the library device 100.

As a result, the present exemplary embodiment has an effect that there never occurs mixing of a plurality of recording media 28 ejected from different logical libraries at the ejection slot 253.

It is because any recording medium 28 correlated with a logical library not designated by the external device 9 is not ejected. It is also because it never occurs that a recording medium 28 correlated with a logical library not designated by the operator 150 is ejected.

The present exemplary embodiment has also an effect that it can accept a plurality of medium movement process commands even if they are issued simultaneously from a plurality of external devices, and therefore can perform ejection of recording media 28 efficiently.

It is because a plurality of recording media 28 whose ejections are desired by the plurality of external devices are independently correlated with logical ejection slots in respective logical libraries correlated to the external devices. Therefore it never occurs that one of the external devices 15 and 16 is forced to suspend ordering a medium movement process command until a recording medium 28 whose ejection is ordered by the other one of the external devices 15 and 16 is ejected to the ejection slot 253 and then extracted by the operator 150.

The configuration of the present exemplary embodiment is based on that of the first and second exemplary embodiments. Accordingly, the present exemplary embodiment has also the same effect as the first and second exemplary embodiments.

Next, a modified example based on the third exemplary embodiment will be described with reference to the block diagram and tables shown in FIGS. 3 to 5 and flow charts shown in FIGS. 13 to 15.

A library device 100 of the modified example in the present exemplary embodiment is different from the third exemplary embodiment. The differences are in that movement of the recording medium 28 to the ejection slot 253 is triggered not by the ejection slot opening process, which is an operation of designating a logical library at the UI 27 performed by the operator 150, but by the medium movement process which moves a logical recording medium from a logical library to a logical ejection slot.

The following description will be given mainly of characteristic portions in the present exemplary embodiment and, to the same constituent elements in the present exemplary embodiment as that in the above-described third exemplary embodiment, the respective same signs are given, and duplicated descriptions of such constituent elements will be omitted.

Figure 13:
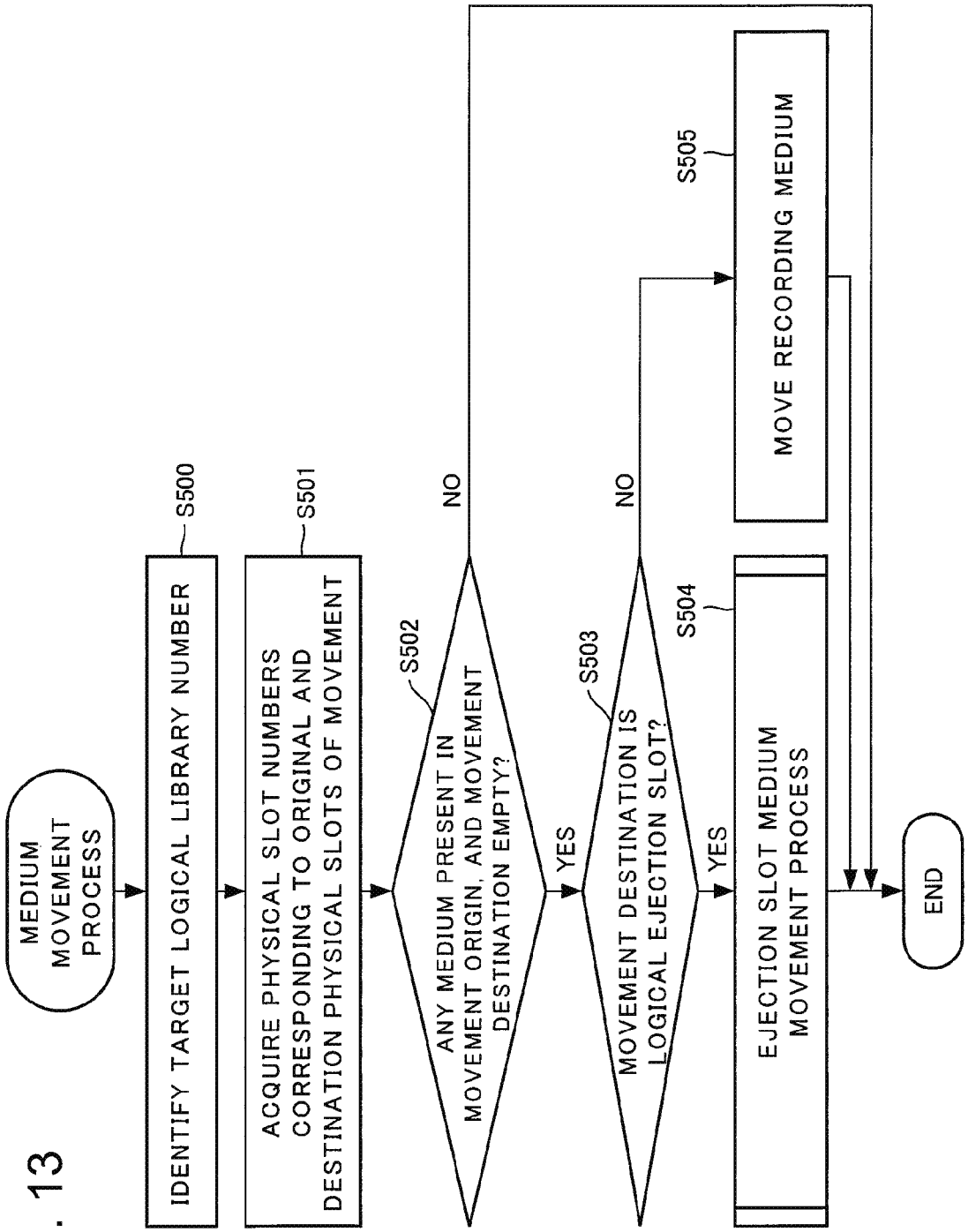
FIG. 13 is a flow chart illustrating a medium movement process of moving the recording medium when an ejection slot is empty, in a library device in a modified example of the third exemplary embodiment of the present invention.

FIG. 13 is a flow chart illustrating a medium movement process of moving the recording medium 28 when the ejection slot 253 is empty, in the library device 100 in the modified example of the third exemplary embodiment.

In the flow chart illustrating the medium movement process shown in FIG. 13, steps S500, S501, S502, S503 and S505 are the same as the steps S100, S101, S102, S103 and S105, respectively, shown in the medium movement process in FIG. 6 in the third exemplary embodiment, and accordingly their descriptions will be omitted here.

Because steps after S504 shown in FIG. 13 are different from the steps in the third exemplary embodiment, their operations will be described below.

Figure 14:
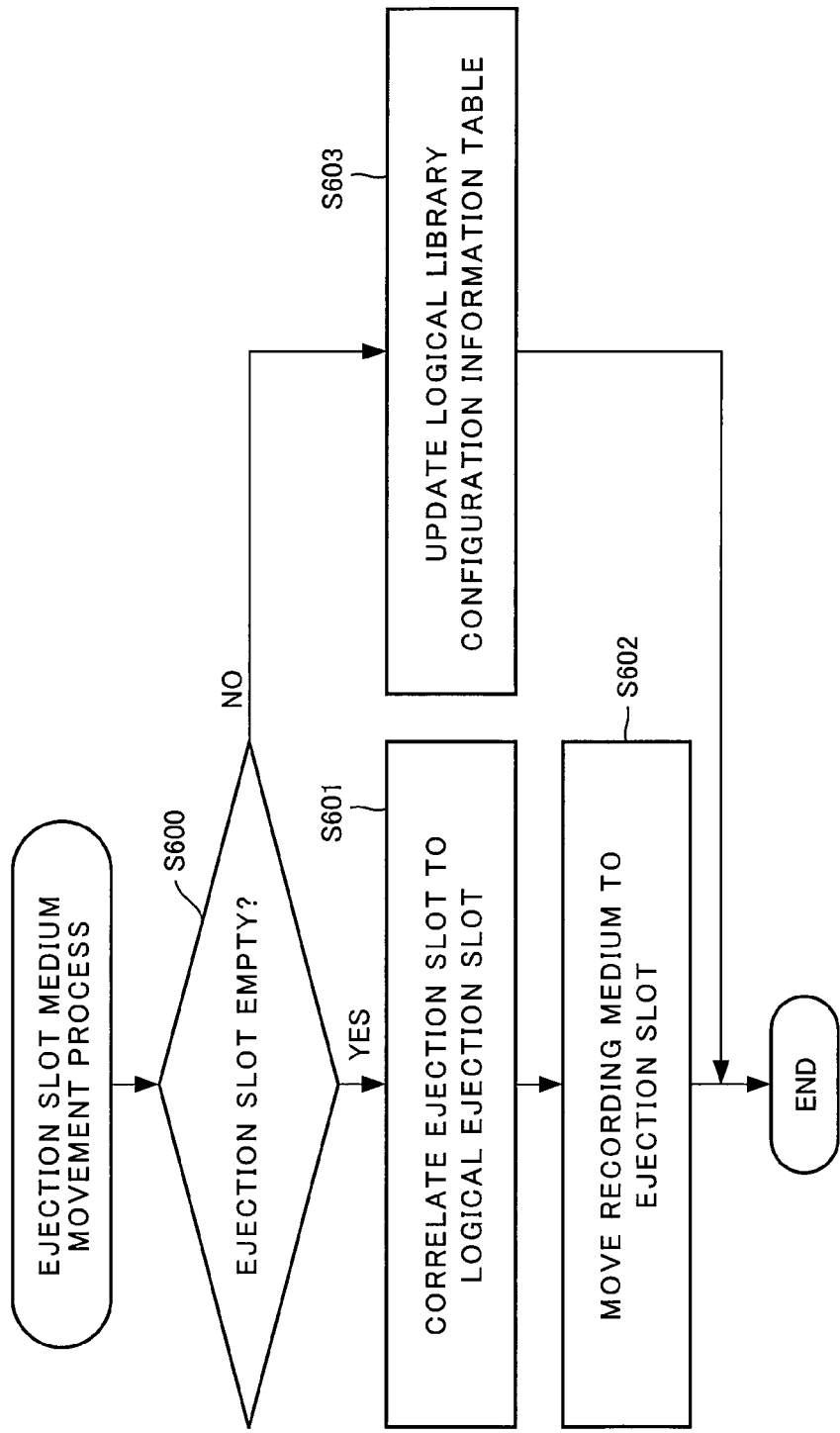
FIG. 14 is a flow chart illustrating the medium movement process of moving the recording medium to the ejection slot when the ejection slot is empty, in the library device in the modified example of the third exemplary embodiment of the present invention.

If the movement destination of the recording medium 28 in the slot unit 25 is a logical ejection slot (YES at the step S503), the control section 11 in the library device 100 executes a medium movement process shown in FIG. 14 which moves a medium to an ejection slot (step S504).

FIG. 14 is a flow chart illustrating the medium movement process, in the library device 100 in the modified example of the present exemplary embodiment, which moves the recording medium 28 to the ejection slot 253 when the ejection slot 253 is empty.

First, the control section 11 checks whether or not the recording medium 28 is present in the ejection slot 253, which is a physical ejection slot (that is, the ejection slot 253 is empty or not) (step S600).

In that step, for example, the control section 11 may give an order to collect information on the library device 100 and thereby check whether or not the recording medium 28 is present in the ejection slot 253.

Then, if the ejection slot 253 is empty (YES at the step S600), the control section 11 correlates the recording medium 28 to eject with the ejection slot 253, by correlating the physical slot number of the recording medium 28 with a logical ejection slot present in the logical slot number column of the logical library configuration information table 132 (step S601).

Then, the control section 11 moves the recording medium 28, in the slot unit 25, correlated to the original physical slot of the movement, the physical slot #2, to the destination physical slot of the movement, the ejection slot 253 (step S602).

On the other hand, if the ejection slot 253 already contains any recording medium 28 and therefore is not empty (NO at the step S600), the control section 11 updates the logical library configuration information table 132 (step S603).

Operation of the update of the logical library configuration information table 132 in the step S603 is the same as the step S104 in the medium movement process shown in FIG. 6 in the third exemplary embodiment, and therefore its description will be omitted here.

Subsequently, the recording medium 28 having been moved to the ejection slot 253 is extracted from the ejection slot 253 by the operator 150. Operation of an ejection slot opening process in that stage will be described below using FIG. 15.

Figure 15:
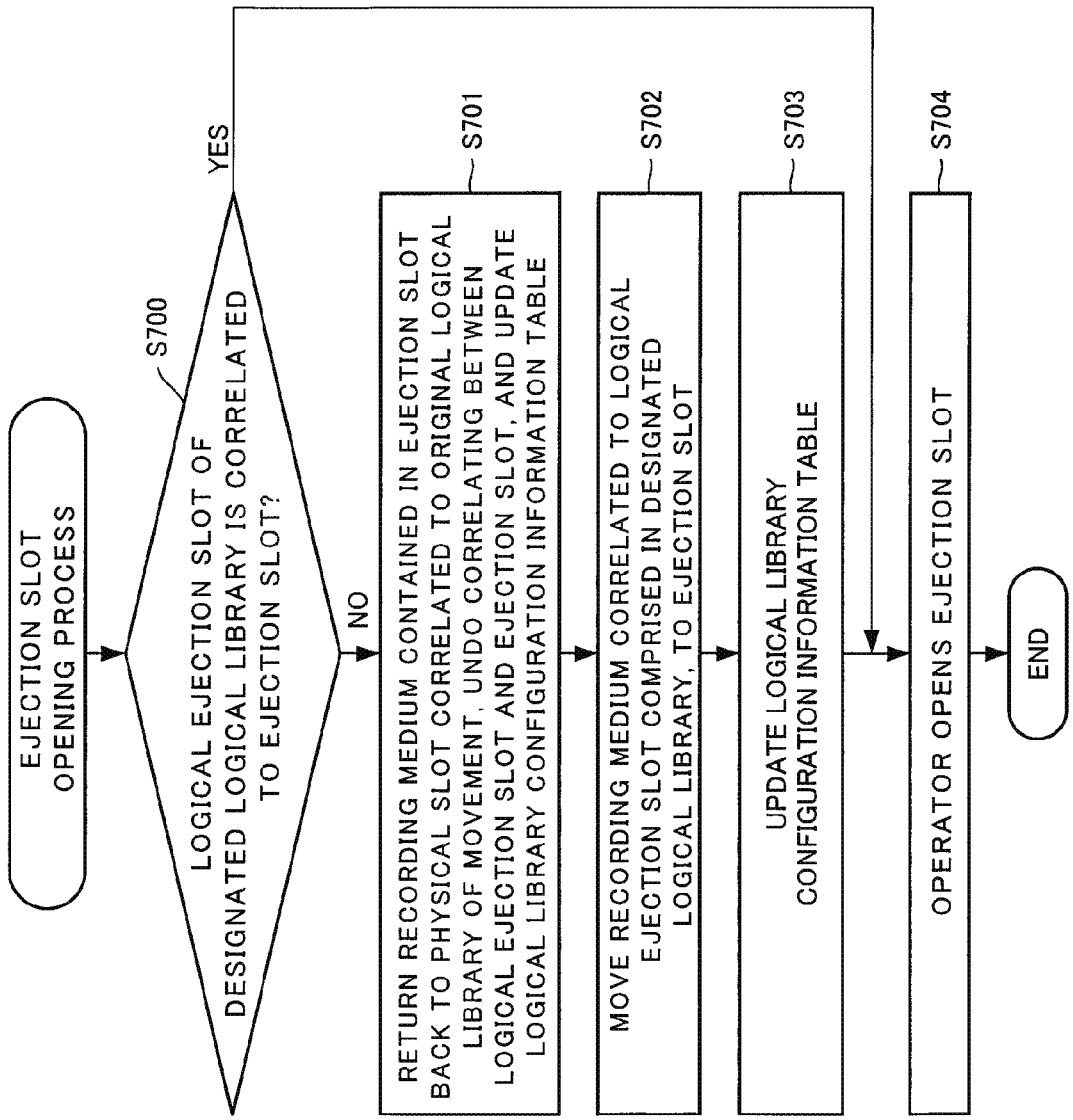
FIG. 15 is a flow chart illustrating the ejection slot opening process which is performed when extracting the recording medium having been moved to the ejection slot, in a library device in the modified example of the third exemplary embodiment of the present invention.

FIG. 15 is a flow chart illustrating the ejection slot opening process performed when extracting the recording medium 28 having been moved to the ejection slot 253, in the library device 100 in the modified example of the third exemplary embodiment.

In the ejection slot opening process performed in the library device 100 of the present modified example, the operator 150 designates any one of logical libraries in the logical library unit 4 using the UI 27.

Then, the control section 11 checks whether or not the logical ejection slot in the logical library designated by the operator 150 is correlated to the ejection slot 253, by referring to the logical library configuration information table 132 (step S700).

If the logical ejection slot is already correlated to the ejection slot 253 (YES at the step S700) the control section 11 ends the ejection slot opening process without moving the recording medium 28.

Then, the operator 150 is allowed to open the ejection slot 253 (step S704).

On the other hand, if the result of checking the logical library configuration information table 132 indicates that the logical ejection slot in the logical library designated by the operator 150 has not been correlated to the ejection slot 253 (NO at the step S700), the control section 11 performs the following process.

The control section 11 undoes the correlating of the logical ejection slot with the ejection slot 253 and the movement of the recording medium 28 to the ejection slot 253, which have been performed in the steps S601 and S602 in the ejection slot medium movement process shown in FIG. 14.

Then, the control section 11 performs the same process as that of the step S603 also in the ejection slot medium movement process shown in FIG. 14, which is a process of updating the corresponding contents in the logical library configuration information table 132 performed when the ejection slot 253 is not empty (if NO at the step S600) (step S701).

That is, the control section 11 moves the recording medium 28 stored in the ejection slot 253 back to the physical slot, in the slot unit 25, correlated to the logical library being the origin of the ejection. Then, the control section 11 undoes the correlating of the logical ejection slot with the ejection slot 253. Then, the control section 11 updates the logical library configuration information table 132 on the basis of the above-described contents of the change.

After that, the control section 11 moves the recording medium 28 correlated with the logical ejection slot in the logical library designated by the operator 150 to the ejection slot 253 (step S702).

Then, the control section 11 updates the logical library configuration information table 132 (step S703).

After that, the operator 150 is allowed to open the ejection slot 253 (step S704).

The processes represented by the steps S702 to S704 are similar to that of the steps S200 to S202 in the ejection slot opening process already described using FIG. 7 in the third exemplary embodiment, and therefore their detailed descriptions will be omitted here.

As a result of including the above-described medium movement process (FIG. 13), ejection slot medium movement process (FIG. 14) and ejection slot opening process (FIG. 15), the present modified example has an effect. The effect is the time duration from the start of operation by the operator 150 for designating a logical library in the ejection slot opening process (FIG. 15) the time to be allowed to open the ejection slot 253, can be reduced, when the logical library designated by the operator 150 is the same as the logical library to which the recording medium 28 having been moved in advance to the ejection slot 253 if the ejection slot 253 was empty is correlated.

It is because, on receiving an order of the medium movement process (FIG. 13), if the ejection slot 253 is empty, the library device 100 can move the recording medium 28 to be ejected directly to the ejection slot 253.

In other words, the present modified example has an effect that, a result of ejecting the recording medium 28 to the ejection slot 253 in advance, the operator 150 does not need to wait during the time period since his/her designating the logical library correlated with the recording medium 28 at the UI 27 until the robot 24 conveys the recording medium 28 to the ejection slot 253. Because, it is often the case that the recording medium 28 whose ejection is ordered by an AP at the external device 9 is extracted by the operator 150 from the ejection slot 253

The configuration of the present exemplary embodiment is based on that of the first to third exemplary embodiments. Accordingly, the present exemplary embodiment also has the same effect as the first to third exemplary embodiments.

Next, a fourth exemplary embodiment based on the first to third exemplary embodiments will be described with reference to FIGS. 8 to 12.

Figure 8:
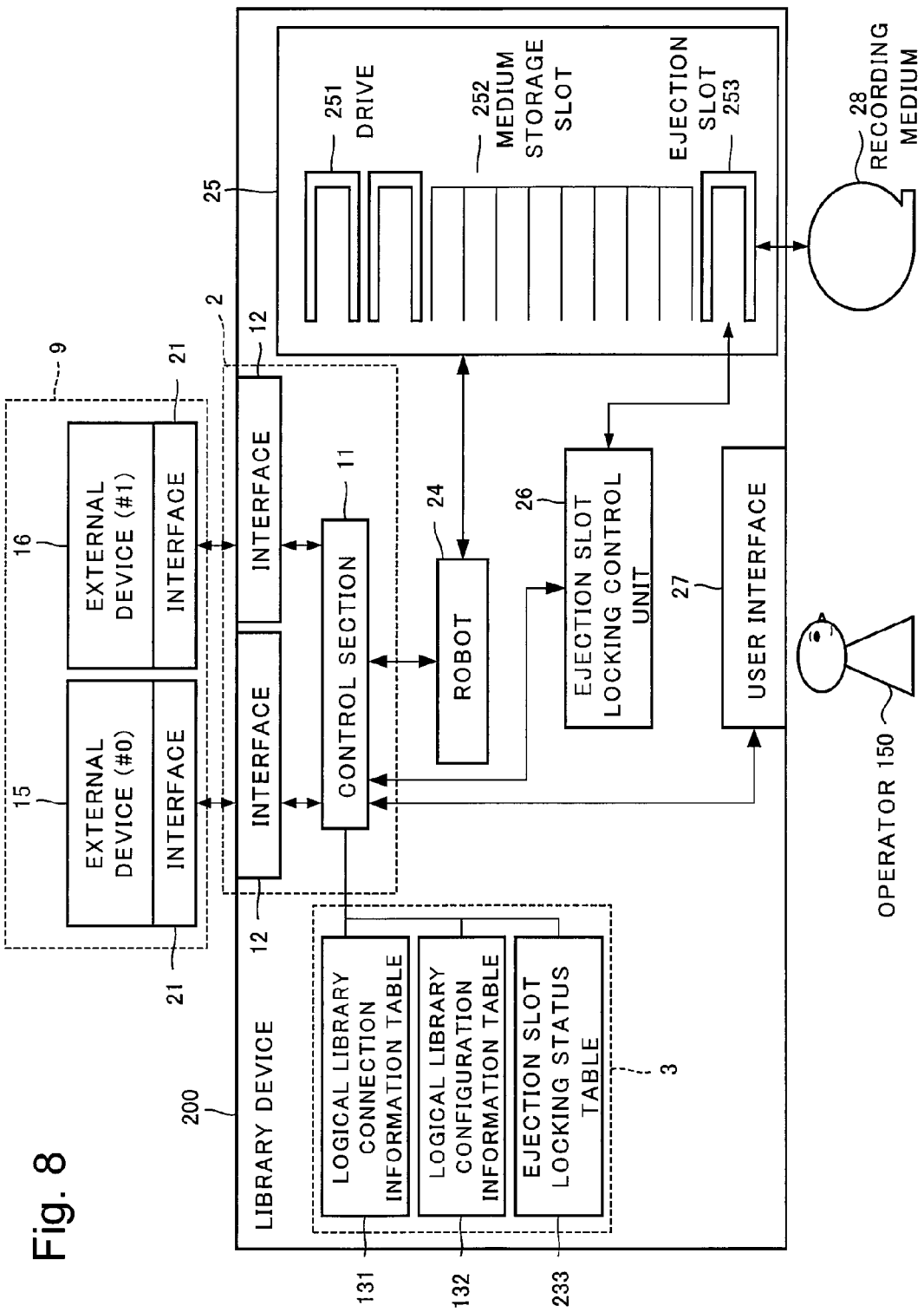
FIG. 8 is a block diagram showing a fourth exemplary embodiment of the present invention.

FIG. 8 is a block diagram showing the fourth exemplary embodiment of the present invention.

Referring to FIG. 8, the present exemplary embodiment is composed of the external device 9 and a library device 200.

The library device 200 in the present exemplary embodiment includes, in addition to the constituent elements of the library device 100 in the third exemplary embodiment, an ejection slot locking control unit 26 which performs locking and unlocking of a lock used at the time of opening and closing of the ejection slot 253, and an ejection slot locking status table 233 which manages locked and unlocked states of the lock used at the time of opening and closing of the ejection slot 253 with respect to each of logical libraries in the logical library unit 4.

The library device 200 in the present exemplary embodiment is further different from the library device 100 in the third exemplary embodiment in that it receives a command for prohibiting or permitting extraction of a recording medium 28 from the ejection slot 253, which is ordered by the external device 9 and referred to as "PREVENT ALLOW MEDIUM REMOVAL".

The following description will be given mainly of characteristic portions in the present exemplary embodiment and, to the same constituent elements in the present exemplary embodiment as that in the above-described first to third exemplary embodiments, the respective same signs are given, and duplicated descriptions of such constituent elements will be omitted.

The control section 11 in the present exemplary embodiment locks and unlocks the lock used at the time of opening and closing of the ejection slot 253, by controlling the ejection slot locking control unit 26 on the basis of the above-described "PREVENT ALLOW MEDIUM REMOVAL" command ordered by the external device 9.

The above-described "PREVENT ALLOW MEDIUM REMOVAL" command issued by the external device 9 is described in detail in "SMC-3" mentioned in the third exemplary embodiment. Accordingly, a detailed description of the command will be omitted here.

Then, it is premised that, in its ordinary state (that is, in the state other than when opening the ejection slot 253 in order to extract a recording medium 28), the library device 200 in the present exemplary embodiment is operated with the ejection slot 253 closed and with the lock of the ejection slot 253 locked, so as to prevent careless extraction of a recording medium 28 by the operator 150 from the outside, for example.

The following description will be given of operation for extracting a recording medium 28 from the ejection slot 253 using the ejection slot locking control unit 26.

Figure 9:
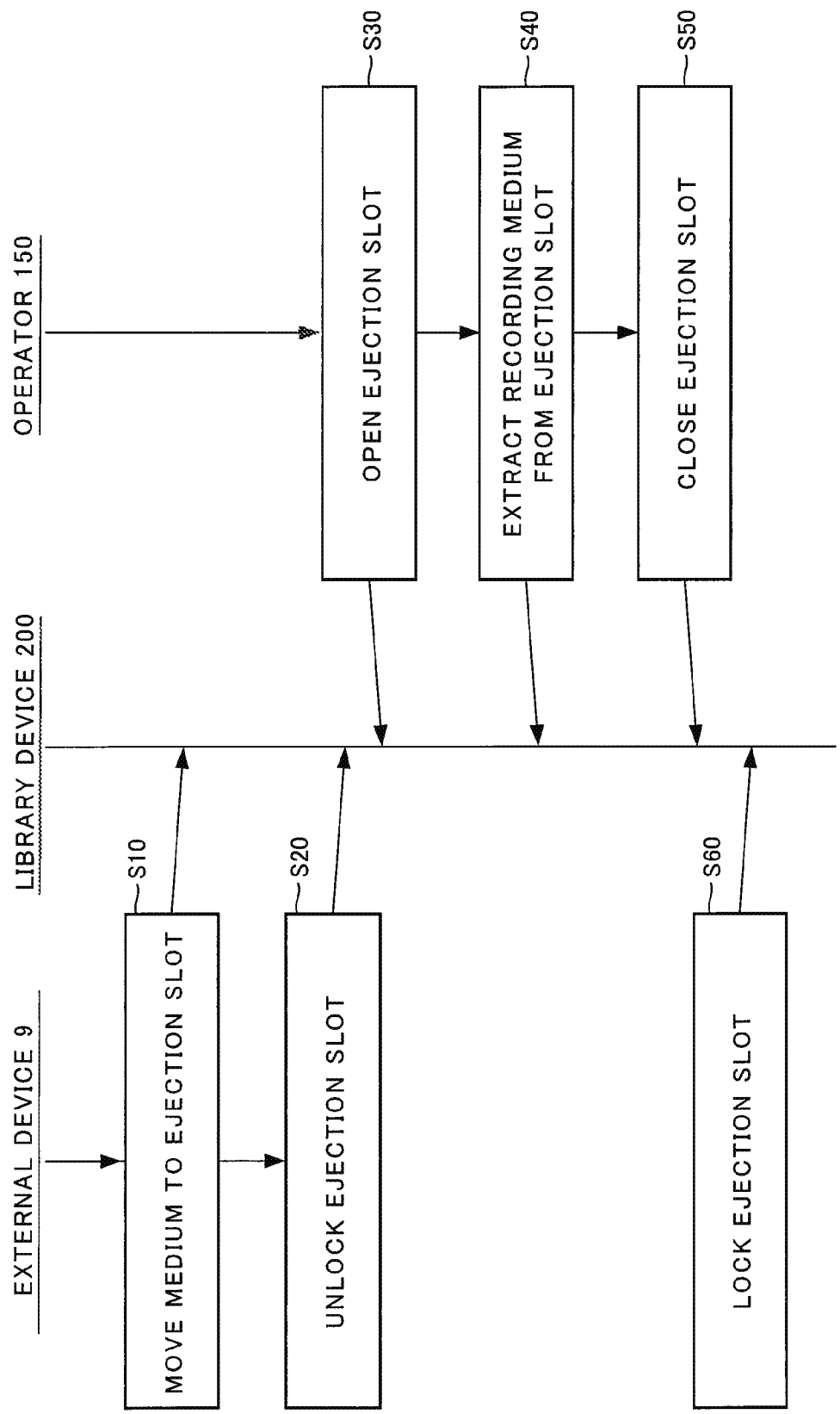
FIG. 9 is a sequence diagram illustrating contents of instructions given by an external device and an operator to a library device in the fourth exemplary embodiment of the present invention when ejecting a recording medium stored in the library device.

FIG. 9 is a sequence diagram illustrating contents ordered by the external device 9 and the operator 150 to the library device 200 when ejecting a recording medium 28 stored in the library device 200 in the fourth exemplary embodiment.

Referring to FIG. 9, the external device 9 orders the library device 200 to move a recording medium 28 stored in the slot unit 25 to the ejection slot 253 (step S10).

Then, in order to enable extraction of the recording medium 28 having been moved to the ejection slot 253 to the outside of the library device 200, the external device 9 issues an order to unlock the lock for opening the ejection slot 253 (step S20).

Then, the control section 11 in the library device 200 controls the ejection slot locking control unit 26 to unlock the lock for opening the ejection slot 253 (not illustrated in FIG. 9).

Then, the operator 150 opens the ejection slot 253 (step S30) and extracts the recording medium 28 stored in the ejection slot 253 to the outside of the library device 200 (step S40). After the extraction of the ejected recording medium 28, the operator 150 closes the ejection slot 253 (step S50).

Then, the external device 9 issues an order to lock the ejection slot 253 (step S60). Accordingly, the library device 200 locks again the ejection slot 253 (not illustrated in FIG. 9) and ends the ejection process on the recording medium 28.

Next, a description will be given of a process of unlocking the lock of the ejection slot 253 and then extracting the ejected recording medium 28, using a table shown in FIG. 10 and flow charts shown in FIGS. 11 and 12.

Figure 10:
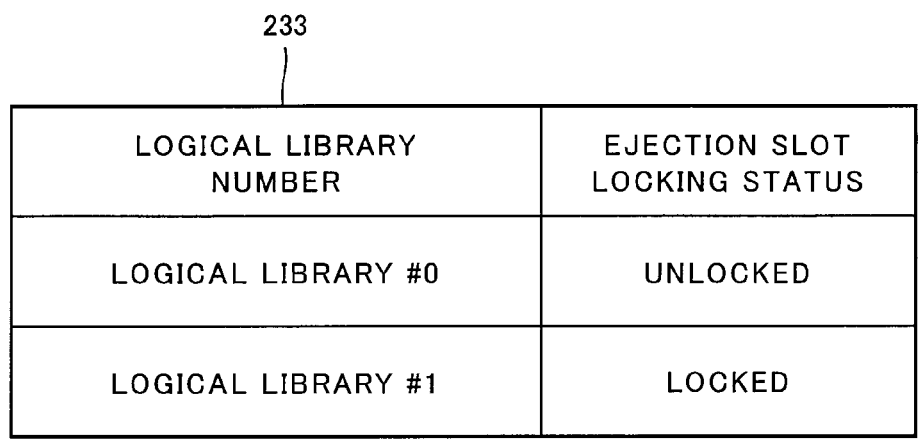
FIG. 10 is a table conceptually showing an ejection slot locking status table in the library device in the fourth exemplary embodiment of the present invention.

FIG. 10 is a table conceptually showing an ejection slot locking status table in the library device 200 in the fourth exemplary embodiment.

Figure 11:
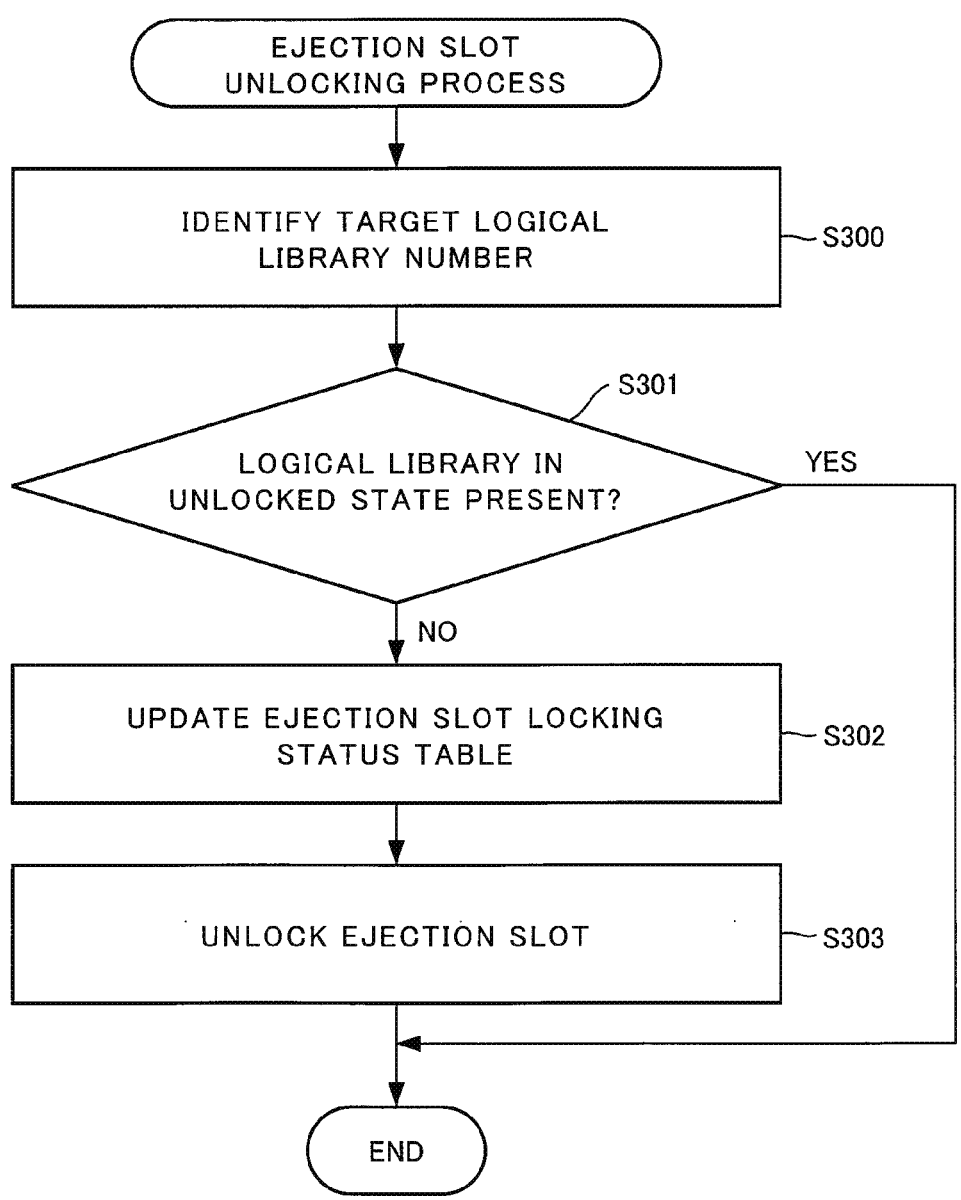
FIG. 11 is a flow chart illustrating an ejection slot unlocking process in the library device in the fourth exemplary embodiment of the present invention.

FIG. 11 is a flow chart illustrating a process of unlocking the ejection slot 253 in the library device 200 in the present exemplary embodiment.

That is, FIG. 11 shows a flow of a process of unlocking the ejection slot 253 which is performed by the control section 11 on receiving from the external device 9 a "PREVENT ALLOW MEDIUM REMOVAL" command being an order to unlock the lock for opening the ejection slot 253.

Referring to FIG. 11, the control section 11 receives from the external device 9 a "PREVENT ALLOW MEDIUM REMOVAL" command being an order to unlock the lock for opening the ejection slot 253 (hereafter, referred to as "ejection slot unlocking command"). Then, from the port number through which the ejection slot unlocking command has been received, the target ID and the LUN, the control section 11 identifies a logical library, in the logical library unit 4, with respect to which the command has been issued, by referring to the logical library connection information table 131 shown in FIG. 4 (step S300).

Then, the control section 11 refers to the ejection slot locking status table 233 (FIG. 10), and thereby checks whether or not there is any logical library, among logical libraries other than the one with respect to which the ejection slot unlocking command has been received, for which the lock for opening the ejection slot 253 is already unlocked (step S301).

Here, a description will be given of the ejection slot locking status table 233. In the ejection slot locking status table 233, the first column is a logical library number column showing logical library numbers. The second column is an ejection slot locking status column showing a locking status of each ejection slot. The ejection slot locking status represents, for each logical library number, whether the lock for opening a shared ejection slot 253 is in the locked state or in the unlocked state. The ejection slot locking status table 233 is a table representing the states.

If there is no other logical library for which the lock for opening the ejection slot 253 is already unlocked (NO at the step S301), the control section 11 updates the ejection slot locking status table 233 such that the logical library with respect to which the ejection slot unlocking command has been accepted is given the unlocked state (step S302).

Then, the control section 11 controls the ejection slot locking control unit 26 to unlock the lock for opening the ejection slot 253 (step S303) and ends the process.

If there is any logical library for which the lock for opening the ejection slot 253 is already unlocked (YES at the step S301), the control section 11 reports a BUSY status (not illustrated in FIG. 11) to the external device 9, and ends the ejection slot unlocking process.

Figure 12:
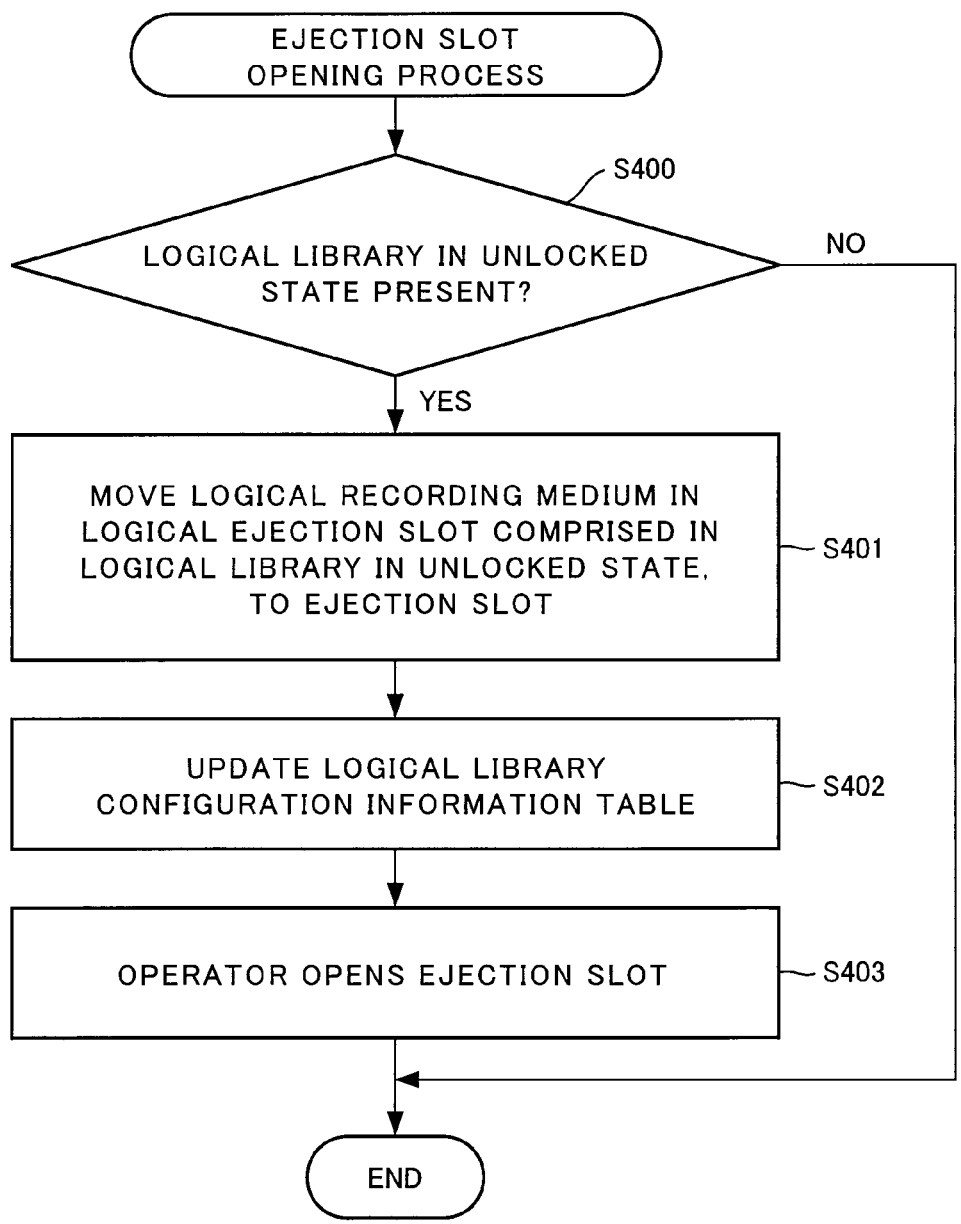
FIG. 12 is a flow chart illustrating an ejection slot opening process in the library device in the fourth exemplary embodiment of the present invention.

Next, FIG. 12 is a flow chart illustrating an ejection slot opening process performed in the library device 200 in the present exemplary embodiment.

That is, FIG. 12 is a diagram illustrating a flow of an ejection slot opening process which is performed by the control section 11 when the operator 150 opens the ejection slot 253 in order to extract a recording medium 28.

In the ejection slot opening process shown in FIG. 12, when the operator 150 has performed operation of opening the ejection slot 253 by manual, for example, using such as a mechanical system, the control section 11 in the library device 200 checks whether or not there is any logical library given the unlocked state, by referring to the ejection slot locking status table 233 (step S400).

If there is any logical library given the unlocked state (YES at the step 400), the control section 11 determines that a recording medium 28 correlated to the logical library is desired to be ejected, and moves to the ejection slot 253 a recording medium 28, in the slot unit 25, which is correlated to the logical ejection slot in the logical library (step S401).

After that, the control section 11 updates the logical library configuration information table 132 (step S402). Then, the operator 150 is allowed to open the ejection slot 253 (step S403).

The process in the step S403 for opening the ejection slot 253 is the same as that in the steps S201 and S202 described in the third exemplary embodiment, and therefore its description will be omitted here.

If, at the step S400, there is no logical library given the unlocked state (NO at the step 400), the control section 11 informs that the lock for opening of the ejection slot 253 is locked by the external device 9 to the user by the use of the UI 27, for example, (not illustrated in FIG. 12), and ends the ejection slot opening process.

As has been described above, the library device 200 in the present exemplary embodiment determines whether or not to allow the operator 150 to open or close the ejection slot 253, on the basis of the ejection slot unlocking command received from the external device 9.

Accordingly, the library device 200 is operated such that, for example, it prohibits the operator 150 from carelessly extracting or inserting a recording medium until the external device 9 gives an order to unlock the lock for opening the ejection slot 253.

The library device 200 in the present exemplary embodiment can be applied to a case in which a hardware locking mechanism such as the ejection slot locking control unit 26 is employed and the external device 9 uses an AP which gives an order to unlock a lock held by the hardware locking mechanism.

As seen from the above description, the present exemplary embodiment has an effect that, even in the above-mentioned form of operation, the operator 150 can extract from the ejection slot 253 a recording medium 28 having been ejected there by only performing operation of opening the ejection slot 253 by manual, for example, without designating any logical library in the logical library unit 4, and therefore can perform the extraction efficiently.

It is because the control section 11 identifies a logical library given the unlocked state permitting extraction from the ejection slot 253, by referring to the ejection slot locking status table 233, and then a recording medium 28, in the slot unit 25, correlated to the logical library identified is ejected to the ejection slot 253.

The configuration of the present exemplary embodiment is based on that of the first to third exemplary embodiments. Therefore, the present exemplary embodiment has also the same effect as the first to third exemplary embodiments.

Figure 16:
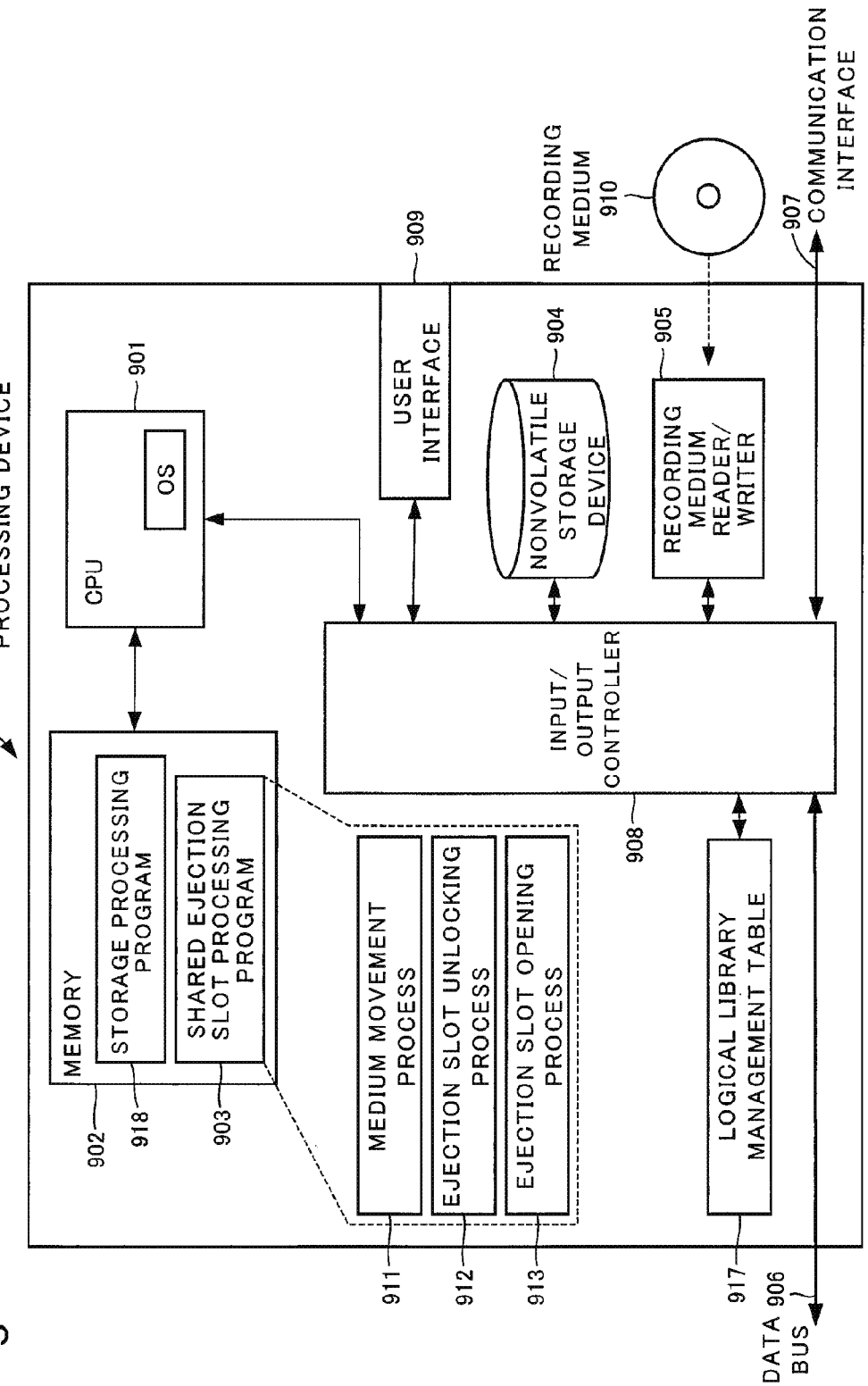
FIG. 16 is a block diagram showing a configuration of an information processing device for implementing functions of the respective library devices in the first to fourth exemplary embodiments of the present invention.

Next, a fifth exemplary embodiment based on the first to fourth exemplary embodiments will be described with reference to FIG. 16. FIG. 16 is a block diagram showing a configuration to implement the functions of the library devices 1, 10, 100 and 200 (in FIGS. 1, 2, 3 and 8) in the first to fourth exemplary embodiments by the use of an information processing device 900.

A library device according to the present exemplary embodiment is different from that of the first to fourth exemplary embodiments in that the functions and processes in the first to fourth exemplary embodiments are implemented by a central processing unit (hereafter, abbreviated as "CPU") 901 and software (abbreviated as "SW", hereafter) consisting of an operating system (abbreviated as "OS", hereafter) and an AP in the information processing device 900.

Referring to FIG. 16, the information processing device 900 in the present exemplary embodiment includes the CPU 901, a memory 902, a shared ejection slot processing program 903 which is an AP, a nonvolatile storage device 904, a recording medium reader/writer 905 which is used for supplying an AP to the information processing device 900, a data bus 906, a communication interface 907, an input/output controller 908, a user interface 909, a recording medium 910, a logical library management table 917 and a storage processing program 918 which is another AP for controlling the information processing device 900 as a library device.

The logical library management table 917 includes the logical library connection information table 131, the logical library configuration information table 132 and the ejection slot locking status table 233, which are used also in the third and fourth exemplary embodiments.

The hardware resources described in the third and fourth exemplary embodiments such as the robot 24, the slot unit 25, the UI 27 and the locking mechanism for opening and closing the ejection slot 253 in the ejection slot locking control unit 26 may be arranged, for example, in a physical library device (not illustrated in FIG. 16) which will be described later.

In the information processing device 900 of the present exemplary embodiment, for example, the functions in the block diagrams shown in FIGS. 3 and 8, the tables shown in FIGS. 4, 5 and 10, and the processes represented by the flow charts or the sequence diagram shown in FIGS. 6, 7, 9 and 13 to 15 are implemented by collaborative operation of the CPU 901 comprised in the information processing device 900 shown in FIG. 16, the OS which is SW operating in the CPU 901, and the shared ejection slot processing program 903 which is a control program developed in the memory 902.

Next, a description will be given of the shared ejection slot processing program 903 which is used for using the ejection slot 253 shared in the library device implemented by the information processing device 900.

The description will be given of, as an example, a control program used in the case the library device 200 in the fourth exemplary embodiment based on the first to third exemplary embodiments is implemented by the information processing device 900, in the present exemplary embodiment.

However, the implementation is not limited to the fourth exemplary embodiment, and by appropriately modifying the shared ejection slot processing program 903 and the memory processing program 918, mentioned above, or the like, the third exemplary embodiment and the modified example of the third exemplary embodiment also can be implemented by the information processing device 900.

The shared ejection slot processing program 903 includes, as processing functions, a medium movement process 911, an ejection slot unlocking process 912 and an ejection slot opening process 913.

Here, the medium movement process 911 is a process of ejecting from or moving within the library device a recording medium 28 (not illustrated in FIG. 16) and, in accordance with the result, updating the logical library configuration information table 132 comprised in the logical library management table 917, which has been described using FIG. 6 in the third exemplary embodiment on which the fourth exemplary embodiment is based.

The ejection slot unlocking process 912 is a process of, according to an order to unlock the lock of the ejection slot 253 received from the external device 9, controlling the ejection slot locking control unit 26 to unlock the lock for opening the ejection slot 253, which has been described using FIG. 11 in the fourth exemplary embodiment.

The ejection slot opening process 913 is a process of, in response to the order to unlock the lock for opening the ejection slot 253 received from the external device 9, moving a recording medium 28 to be ejected, to the ejection slot 253 whose lock has been unlocked, which has been described using FIGS. 9 and 12 in the fourth exemplary embodiment.

Descriptions of operations for executing the above-described processes have already been given using the respective flow charts in the third and fourth exemplary embodiments, and therefore their detail descriptions will be omitted in the present exemplary embodiment.

The external device 9 mentioned above is an information processing device, such as a server device, which gives the information processing device 900 an order to eject or move a recording medium 28, or to lock or unlock the lock for opening or closing the ejection slot 253.

The logical library management table 917 shown in FIG. 16 may be arranged in the readable/writable nonvolatile storage device 904. The logical library management table 917 may also be arranged in the memory 902 along with the shared ejection slot processing program 903 and the storage processing program 918.

Also, source programs of the shared ejection slot processing program 903 and of the storage processing program 918 may be stored in the nonvolatile storage device 904. Then, they may be loaded into the memory 902 at a start-up of the information processing device 900.

As already mentioned, the information processing device 900 includes the recording medium reader/writer 905 which reads (and writes) the shared ejection slot processing program 903 in a form of a file or data from the outside, an input/output controller 908 which controls input/output operation on various kinds of input/output data or the like used by the information processing device 900, through control by the OS in cooperation with the CPU or the like, the data bus 906 enabling data exchange with the external device 9 or the like, and the communication interface 907 enabling the same.

For the data bus 906, interfaces, protocols or the like specified by, for example, Fiber Channel (referred to as "FC", hereafter), Serial Attached SCSI (abbreviated as "SAS", hereafter), Automation/Drive Interface (abbreviated as "ADI", hereafter) and the like may be used. However, a type of the data bus 906 is not limited to those ones.

The library device implemented by the information processing device 900 can control a physical library device, not illustrated, through the data bus 906 of one of the interfaces described above. The physical library device includes, for example, the robot 24, the slot unit 25, the ejection slot locking control unit 26 and the user interface (UI) 27, all of which have been described in the fourth exemplary embodiment.

In that case, the information processing device 900 may control a server device, for example, corresponding to the external device 9 and the physical library device mentioned above to cooperate with each other, by executing the storage processing program 918.

The physical library device may be arranged outside the information processing device 900. The physical library device may also be arranged inside the information processing device 900, and in that case, the data bus 906 shown in FIG. 16, for example, is connected to the physical library device within the information processing device 900.

The library device implemented by the information processing device 900 also includes the user interface 909, and can make the user interface 909 display a logical library to which a recording medium 28, not illustrated in FIG. 16, whose ejection has been ordered by the external device 9 is correlated, the ejection slot 253 correlated to the logical library, and the locked or unlocked state of the lock for opening the ejection slot 253.

The user interface 909 may be implemented by a display or the like (not illustrated in FIG. 16) capable of displaying and buttons or the like (not illustrated in FIG. 16) enabling input operation.

Then, on the basis of contents displayed at the user interface 909, the operator 150 may perform input operation using the user interface 909 and thereby extract a recording medium 28 from the library device.

The user interface 909 may also display, for example, statuses of the server device corresponding to the external device 9, logical ejection slots in the logical library unit 4 and physical slots in the physical library unit 8, along with their connection information, slot numbers and the like.

For example, as described in the third exemplary embodiment, the operator 150 may cause the user interface 909 to display a screen showing a logical library to which a recording medium 28 whose ejection has been ordered by the external device 9 is correlated, and press a button or the like corresponding to a screen display representing the logical library, and thereby designate the logical library.

Accordingly, the operator 150 can enjoy an effect that he/she can have only a recording medium 28 correlated to the designated logical library ejected to the ejection slot 253.

Further, as described in the fourth exemplary embodiment, the operator 150 may cause the user interface 909 to display the locked or unlocked state of the lock for opening the ejection slot 253. Further, and after confirming by the screen display that the lock for opening the ejection slot 253 has been unlocked, the operator 150 may open the ejection slot 253, without performing the operation of designating a logical library correlated with a recording medium 28 to eject.

Accordingly, the operator 150 can enjoy an effect that he/she can efficiently extract a recording medium 28 from the ejection slot 253.

In the information processing device 900 according to the present exemplary embodiment, the blocks in the above-described library devices 100 (FIG. 3) and 200 (FIG. 8) and the flow charts (FIGS. 6, 7, and 11 to 15) illustrating their control are provided as a control program capable of implementing them, that is, the shared ejection slot processing program 903.

Then, using the control program, the shared ejection slot processing program 903, as a means for controlling the library device implemented by the information processing device 900, by reading it into the memory 902 and executing it by the use of the CPU 901 with the OS in cooperation, the operations of the library devices 100 and 200 described in the third and fourth exemplary embodiments is achieved.

As a method for supplying the above-described control program to the information processing device 900, a method of installing the program into the information processing device 900 using the recording medium reader/writer 905 via various kinds of computer-readable recording media 910 including disk media, such as a floppy (registered trademark) disk and a CD-ROM (Compact Disc-Read Only Memory), and memory media, such as a Universal Serial Bus (abbreviated as "USB") memory, may be employed.

In such a case, the present exemplary embodiment can be regarded as implemented by program code constituting the control program or by the computer-readable recording medium 910 in which the program cord is recorded.

Further, as another method for supplying the above-described control program to the information processing device 900, today's conventional procedures such as a method of installing the program from the external device 9 via the data bus 906 and a method of downloading the program from an external device (not illustrated in FIG. 16) via a wire or wireless communication line, such as the internet, enabling communication using the communication interface 907 may be employed.

Accordingly, the present exemplary embodiment has an effect that the library devices in the first to fourth exemplary embodiment described above can be implemented by the use of the information processing device 900.

It is because the collaborative operation of the CPU, the OS and the AP in the information processing device 900 makes possible the implementation of the functions of the first to fourth exemplary embodiments described above.

The configuration of the present exemplary embodiment is based on that of the third and fourth exemplary embodiments. Accordingly, the present exemplary embodiment also has the same effect as the third and fourth exemplary embodiments.

The present invention is not limited to the exemplary embodiments described above, and various modifications thereof may be made in implementing the present invention.

Part or the whole of the exemplary embodiment described above can be described as, but not limited to, the following supplementary notes.

1. (Supplementary note 1) A library device comprising:
at least an ejection slot which is shared by a plurality of external devices;
a physical library unit which contains a plurality of physical recording media and is divided into a larger number of areas than the number of said ejection slots;

logical library units each of which contains a plurality of logical recording media and are logically correlated with each of said areas;

a logical library information storage unit which stores connection information indicating a connection relationship between each of said logical library units and each of said external devices; and a control unit which correlates the recording medium with said logical library units when each of said physical recording media are ejected;

wherein said control unit refers to said logical library information storage unit in response to a reception of an export process command from said external device, identifies one of said logical library units which is correlated with a physical recording medium in said physical library unit which has been ordered by said export process command to been ejected from said ejection slot, and correlates, in the identified logical library unit, said ejection slot to a logical recording medium which is correlated to said physical recording medium which has been ordered to been ejected.

(Supplementary note 2) The library device according to supplementary note 1, wherein:

said logical library information storage unit comprises a logical library connection information table which stores connection information representing a connection relationship between each of said logical library units and said external devices, and a logical library configuration information table storing logical slot numbers and physical slot numbers which represents a relationship between logical slots including a logical ejection slot, which are comprised in said logical library unit, and physical slots in said physical library unit; and said control unit, in response to a reception of said export process command from said external device, refers to said logical library connection information table, and thereby identifies said logical library unit connected to said external device having issued said export processing command, and also refers to said logical library configuration information table, and thereby logically moves, within the identified logical library unit, said logical recording medium with which said physical recording medium whose ejection has been ordered is correlated, to said logical ejection slot.

(Supplementary note 3) The library device according to supplementary notes 1 or 2, wherein with respect to the logical ejection of said logical recording medium correlated to said physical recording medium whose ejection has been ordered, said control unit acquires a movement origin physical slot number and a movement destination physical slot number representing respectively a movement origin physical slot and a movement destination physical slot, which are respectively original and destination physical slots of the movement, the movement origin and movement destination physical slot numbers corresponding on a one-to-one basis to movement origin and movement destination logical slot numbers representing respectively original and destination logical slots of the movement, in case said physical recording medium is present in said physical slot correlated to said physical slot number corresponding to said movement origin logical slot number and no said physical recording medium is present in said physical slot correlated to said physical slot number corresponding to said movement destination logical slot number:

if said movement destination logical slot number indicates said logical ejection slot, said control unit does not execute the movement of said physical recording medium and performs an update in said logical library configuration information table such that said movement origin physical slot number correlated to said physical slot containing said physical recording medium and said movement destination physical slot number corresponding to said movement destination logical slot number indicating said logical ejection slot are exchanged with each other; and if said movement destination logical slot number does not indicate said logical ejection slot, said control unit moves said physical recording medium in said physical library unit from said movement origin physical slot to said movement destination physical slot.

(Supplementary note 4) The library device according to supplementary notes 2 or 3 further comprising an operation unit which is operated when ejecting said physical recording medium, wherein said control unit:

refers to said logical library configuration information table, in response to designation made at said operation unit of a logical library unit, from among said logical library units, to which said physical recording medium whose ejection from said ejection slot has been ordered by said export process command is correlated;

acquires said physical slot number of said physical slot corresponding to said logical ejection slot comprised in said designated logical library unit, and moves said physical recording medium stored in said physical library unit correlated to the physical slot number, to said ejection slot; and performs an update, in said logical library configuration information table, of returning a changed correspondence relationship between said logical slot and said physical slot back to its original state.

(Supplementary note 5) The library device according to any one of supplementary notes 1 to 4, wherein with respect to the logical ejection of said logical recording medium correlated to said physical recording medium whose ejection has been ordered by said export process command, said control unit acquires physical slot numbers representing movement origin and movement destination physical slots corresponding on a one-to-one basis to movement origin and movement destination logical slot numbers representing respectively original and destination logical slots of the movement, in case said physical recording medium is present in said physical slot, in said physical library unit, correlated to said physical slot number corresponding to said movement origin logical slot number and no said physical recording medium is present in said physical slot correlated to said physical slot number corresponding to said movement destination logical slot number:

if said movement destination logical slot number indicates said logical ejection slot, said control unit executes an ejection slot medium movement process of moving said physical recording medium to said ejection slot; and if said movement destination logical slot number does not indicate said logical ejection slot, said control unit moves said physical recording medium in said physical library unit to said physical slot of the movement destination.

(Supplementary note 6) The library device according to supplementary note 5, wherein, in said ejection slot medium movement process:

said control unit checks whether or not said physical recording medium is present in said ejection slot;

if no physical recording medium is present in said ejection slot, said control unit correlates said ejection slot in said physical library unit to said physical slot number corresponding to said logical slot number of said logical ejection slot in said logical library configuration information table, and moves said physical recording medium whose ejection has been ordered by said export process command to said ejection slot; and if any physical recording medium is present in said ejection slot, said control unit does not execute the movement of said recording medium whose ejection has been ordered by said export process command, and performs an update, in said logical library configuration information table, of exchanging said movement origin physical slot number and said movement destination physical slot number in said correspondence relationship of physical slot number.

(Supplementary note 7) The library device according to supplementary notes 5 or 6, wherein:

in response to designation, made at said operation unit, of said logical library unit to which said recording medium whose ejection has been ordered by said export process command is correlated, said control unit checks whether or not said logical ejection slot in said designated logical library unit is correlated to said ejection slot;

if said logical ejection slot is correlated to said ejection slot, said control unit does not execute the movement of said recording medium;

if said logical ejection slot is not correlated to said ejection slot, said control unit undoes the correlating, made by said ejection slot medium movement process, of said physical slot number corresponding to said logical slot number of said logical ejection slot with said ejection slot in said physical library, returns said recording medium whose movement has been designated and which has been moved by said ejection slot medium movement process from said ejection slot which is said physical slot of the movement destination back to said physical slot of the movement origin, and performs an update of exchanging said physical slot number of the movement origin and that of the movement destination in said physical slot number column of said logical library configuration information table;

said control unit moves said recording medium, in said physical library unit, correlated with said logical ejection slot in said designated logical library unit to said ejection slot; and said control unit performs an update of returning said changed correspondence relationship between said logical ejection slot and said recording medium, in said logical library configuration information table, back to its original state.

(Supplementary note 8) The library device according to supplementary notes 1 or 2, further comprising an ejection slot locking control unit which performs control to unlock a lock for opening said ejection slot, according to an ejection slot unlocking command of unlocking the lock received from said external device, and an ejection slot locking status table, in said logical library information storage unit, which shows a locked or unlocked state of the lock for opening said ejection slot, with respect to each of said logical library units, wherein:

on receiving said ejection slot unlocking command, said control unit identifies said logical library unit, among said logical library units, with respect to which said external device have ordered unlocking of the ejection slot;

referring to said ejection slot locking status information, said control unit checks whether or not there is any said logical library unit, other than said identified logical library unit, with respect to which said lock is in the unlocked state; and if there is no other said logical library unit in said unlocked state, said control unit updates said ejection slot locking status information such that said logical library unit being the target of said ejection slot unlocking command is put into the unlocked state, and also performs control to unlock said lock at said ejection slot.

(Supplementary note 9) The library device according to supplementary notes 1, 2 or 8, wherein:

in response to designation, made at said operation unit, of said logical library unit to which said recording medium whose ejection has been ordered by said export process command is correlated, said control unit refers to said ejection slot locking status table and thereby checks whether or not there is any said logical library unit in the unlocked state; and if there is any said logical library unit in said unlocked state, said control unit moves said logical recording medium in said logical ejection slot included in the logical library unit in the unlocked state to said ejection slot, and performs an update of returning a changed correspondence relationship between said logical slot and said physical slot, in said logical library configuration information table, back to its original state.

(Supplementary note 10) A library device control method which is used in a library device comprising:

at least an ejection slot which is shared by a plurality of external devices; a physical library unit which contains a plurality of physical recording media and is divided into a larger number of areas than the number of said ejection slots; logical library units each of which contains a plurality of logical recording media and are logically correlated with each of said areas; a logical library information storage unit which stores connection information indicating a connection relationship between each of said logical library units and each of said external devices; and a control unit which correlates the recording medium with said logical library units when each of said physical recording media are ejected, comprising:

referring to said logical library information storage unit in response to a reception of an export process command from said external device; and identifying one of said logical library units which is correlated with a physical recording medium in said physical library unit which has been ordered by said export process command to been ejected from said ejection slot; and correlating, in the identified logical library unit, said ejection slot to a logical recording medium which is correlated to said physical recording medium which has been ordered to been ejected.

(Supplementary note 11) A non-transitory recording computer readable medium for storing a control program, which is used in a library device comprising:

at least an ejection slot which is shared by a plurality of external devices; a physical library unit which contains a plurality of physical recording media and is divided into a larger number of areas than the number of said ejection slots; logical library units each of which contains a plurality of logical recording media and are logically correlated with each of said areas; a logical library information storage unit which stores connection information indicating a connection relationship between each of said logical library units and each of said external devices; and a control unit which correlates the recording medium with said logical library units when each of said physical recording media are ejected, which makes a computer execute:

a referring processing in which refers to said logical library information storage unit in response to a reception of an export process command from said external device; and an identifying processing in which identifies one of said logical library units which is correlated with a physical recording medium in said physical library unit which has been ordered by said export process command to been ejected from said ejection slot; and a correlating processing in which correlates, in the identified logical library unit, said ejection slot to a logical recording medium which is correlated to said physical recording medium which has been ordered to been ejected.

The above description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A library device comprising:
   at least an ejection slot which is shared by a plurality of external devices;
   a physical library unit which contains a plurality of physical recording media and is divided into a larger number of areas than the number of said ejection slots;
   logical library units each of which are logically correlated with each of said areas;
   a logical library information storage unit which stores connection information indicating a connection relationship between each of said logical library units and each of said external devices; and
   a control unit which correlates the ejection slot with said logical library units when each of said physical recording media are ejected;
   wherein said control unit;
   refers to said logical library information storage unit in response to a reception of an export process command from said external device,
   identifies one of said logical library units which is correlated with a physical medium storage slot, which is stored a physical recording medium in said physical library unit having been ordered by said export process command to be ejected from said ejection slot,
   correlates, in the identified logical library unit, said physical recording medium, which has been ordered to be ejected, to said ejection slot,
   in response to an input operation for designating said identified logical library unit to an operation unit, designating the identified logical library unit correlated with the physical recording medium to be ejected, and
   moves only the physical recording medium to be ejected to said ejection slot when the physical recording medium is extracted from said storage slot, wherein
   with respect to the logical ejection of said logical recording medium correlated to said physical recording medium whose ejection has been ordered by said export process command, said control unit acquires physical slot numbers representing movement origin and movement destination physical slots corresponding on a one-to-one basis to movement origin and movement destination logical slot numbers representing respectively original and destination logical slots of the movement,
   in case said physical recording medium is present in said physical slot, in said physical library unit, correlated to said physical slot number corresponding to said movement origin logical slot number and no said physical recording medium is present in said physical slot correlated to said physical slot number corresponding to said movement destination logical slot number:
   if said movement destination logical slot number indicates said logical ejection slot, said control unit executes an ejection slot medium movement process of moving said physical recording medium to said ejection slot; and
   if said movement destination logical slot number does not indicate said logical ejection slot, said control unit moves said physical recording medium in said physical library unit to said physical slot of the movement destination,
   in response to designation made at said operation unit of said logical library unit to which said recording medium whose ejection has been ordered by said export process command is correlated, said control unit checks whether or not said logical ejection slot in said designated logical library unit is correlated to said ejection slot;
   if said logical ejection slot is correlated to said ejection slot, said control unit does not execute the movement of said recording medium;
   if said logical ejection slot is not correlated to said ejection slot, said control unit undoes the correlating, made by said ejection slot medium movement process, of said physical slot number corresponding to said logical slot number of said logical ejection slot with said ejection slot in said physical library, returns said recording medium whose movement has been designated and which has been moved by said ejection slot medium movement process from said ejection slot which is said physical slot of the movement destination back to said physical slot of the movement origin, and performs an update of exchanging said physical slot number of the movement origin and that of the movement destination in said physical slot number column of said logical library configuration information table;
   said control unit moves said recording medium, in said physical library unit, correlated with said logical ejection slot in said designated logical library unit to said ejection slot; and
   said control unit performs an update of returning said changed correspondence relationship between said logical ejection slot and said recording medium, in said logical library configuration information table, back to its original state.

2. The library device according to claim 1, wherein with respect to the logical ejection of said logical recording medium correlated to said physical recording medium whose ejection has been ordered, said control unit acquires a movement origin physical slot number and a movement destination physical slot number representing respectively a movement origin physical slot and a movement destination physical slot, which are respectively original and destination physical slots of the movement, the movement origin and movement destination physical slot numbers corresponding on a one-to-one basis to movement origin and movement destination logical slot numbers representing respectively original and destination logical slots of the movement, in case said physical recording medium is present in said physical slot correlated to said physical slot number corresponding to said movement origin logical slot number and no said physical recording medium is present in said physical slot correlated to said physical slot number corresponding to said movement destination logical slot number:

if said movement destination logical slot number indicates said logical ejection slot, said control unit does not execute the movement of said physical recording medium and performs an update in said logical library configuration information table such that said movement origin physical slot number correlated to said physical slot containing said physical recording medium and said movement destination physical slot number corresponding to said movement destination logical slot number indicating said logical ejection slot are exchanged with each other; and if said movement destination logical slot number does not indicate said logical ejection slot, said control unit moves said physical recording medium in said physical library unit from said movement origin physical slot to said movement destination physical slot.

3. The library device according to claim 1, wherein, in said ejection slot medium movement process:

said control unit checks whether or not said physical recording medium is present in said ejection slot;

if no physical recording medium is present in said ejection slot, said control unit correlates said ejection slot in said physical library to said physical slot number corresponding to said logical slot number of said logical ejection slot in said logical library configuration information table, and moves said physical recording medium whose ejection has been ordered by said export process command to said ejection slot; and if any physical recording medium is present in said ejection slot, said control unit does not execute the movement of said recording medium whose ejection has been ordered by said export process command, and performs an update, in said logical library configuration information table, of exchanging said movement origin physical slot number and said movement destination physical slot number in said correspondence relationship of physical slot number.

4. The library device according to claim 1, wherein:

said logical library information storage unit comprises a logical library connection information table which stores connection information representing a connection relationship between each of said logical library units and said external devices, and a logical library configuration information table storing logical slot numbers and physical slot numbers which represents a relationship between logical slots including a logical ejection slot, which are comprised in said logical library unit, and physical slots in said physical library unit; and said control unit, in response to a reception of said export process command from said external device, refers to said logical library connection information table, and thereby identifies said logical library unit connected to said external device having issued said export processing command, and also refers to said logical library configuration information table, and thereby logically moves, within the identified logical library unit, said logical recording medium with which said physical recording medium whose ejection has been ordered is correlated, to said logical ejection slot.

5. The library device according to claim 4 further comprising an operation unit which is operated when ejecting said physical recording medium, wherein said control unit:

refers to said logical library configuration information table, in response to designation made at said operation unit of a logical library unit, from among said logical library units, to which said physical recording medium whose ejection from said ejection slot has been ordered by said export process command is correlated;

acquires said physical slot number of said physical slot corresponding to said logical ejection slot comprised in said designated logical library unit, and moves said physical recording medium stored in said physical library unit correlated to the physical slot number, to said ejection slot; and performs an update, in said logical library configuration information table, of returning a changed correspondence relationship between said logical slot and said physical slot back to its original state.

6. A library device comprising:

at least an ejection slot which is shared by a plurality of external devices;

a physical library unit which contains a plurality of physical recording media and is divided into a larger number of areas than the number of said ejection slots;

logical library units each of which are logically correlated with each of said areas;

a logical library information storage unit which stores connection information indicating a connection relationship between each of said logical library units and each of said external devices;

a control unit which correlates the ejection slot with said logical library units when each of said physical recording media are ejected;

wherein said control unit;

refers to said logical library information storage unit in response to a reception of an export process command from said external device, identifies one of said logical library units which is correlated with a physical medium storage slot, which is stored a physical recording medium in said physical library unit having been ordered by said export process command to be ejected from said ejection slot, correlates, in the identified logical library unit, said physical recording medium, which has been ordered to be ejected, to said ejection slot, in response to an input operation for designating said identified logical library unit to an operation unit, designating the identified logical library unit correlated with the physical recording medium to be ejected, and moves only the physical recording medium to be ejected to said ejection slot when the physical recording medium is extracted from said storage slot;

an ejection slot locking control unit which performs control to unlock a lock for opening said ejection slot, according to an ejection slot unlocking command of unlocking the lock received from said external device, and an ejection slot locking status table, in said logical library information storage unit, which shows a locked or unlocked state of the lock for opening said ejection slot, with respect to each of said logical library units, wherein:

on receiving said ejection slot unlocking command, said control unit identifies said logical library unit, among said logical library units, with respect to which said external device have ordered unlocking of the ejection slot;

referring to said ejection slot locking status information, said control unit checks whether or not there is any said logical library unit, other than said identified logical library unit, with respect to which said lock is in the unlocked state; and if there is no other said logical library unit in said unlocked state, said control unit updates said ejection slot locking status information such that said logical library unit being the target of said ejection slot unlocking command is put into the unlocked state, and also performs control to unlock said lock at said ejection slot.

7. A library device control method which is used in a library device comprising:

at least an ejection slot which is shared by a plurality of external devices; a physical library unit which contains a plurality of physical recording media and is divided into a larger number of areas than the number of said ejection slots; logical library units each of which are logically correlated with each of said areas; a logical library information storage unit which stores connection information indicating a connection relationship between each of said logical library units and each of said external devices;

and a control unit which correlates the ejection slot with said logical library units when each of said physical recording media are ejected, comprising:

referring to said logical library information storage unit in response to a reception of an export process command from said external device; and identifying one of said logical library units which is correlated with a physical medium storage slot, which is stored recording medium in said physical library unit having been ordered by said export process command to be ejected from said ejection slot;

correlating, in the identified logical library unit, said physical recording medium, which has been ordered to be ejected, to said ejection slot;

in response to an input operation for designating said identified logical library unit to an operation unit, designating the identified logical library unit correlated with the physical recording medium to be ejected; and moving only the physical recording medium to be ejected to said ejection slot when the physical recording medium is extracted from said storage slot, wherein with respect to the logical ejection of said logical recording medium correlated to said physical recording medium whose ejection has been ordered by said export process command, said control unit acquires physical slot numbers representing movement origin and movement destination physical slots corresponding on a one-to-one basis to movement origin and movement destination logical slot numbers representing respectively original and destination logical slots of the movement, in case said physical recording medium is present in said physical slot, in said physical library unit, correlated to said physical slot number corresponding to said movement origin logical slot number and no said physical recording medium is present in said physical slot correlated to said physical slot number corresponding to said movement destination logical slot number:

if said movement destination logical slot number indicates said logical ejection slot, said control unit executes an ejection slot medium movement process of moving said physical recording medium to said ejection slot; and if said movement destination logical slot number does not indicate said logical ejection slot, said control unit moves said physical recording medium in said physical library unit to said physical slot of the movement destination, in response to designation made at said operation unit of said logical library unit to which said recording medium whose ejection has been ordered by said export process command is correlated, said control unit checks whether or not said logical ejection slot in said designated logical library unit is correlated to said ejection slot;

if said logical ejection slot is correlated to said ejection slot, said control unit does not execute the movement of said recording medium;

if said logical ejection slot is not correlated to said ejection slot, said control unit undoes the correlating, made by said ejection slot medium movement process, of said physical slot number corresponding to said logical slot number of said logical ejection slot with said ejection slot in said physical library, returns said recording medium whose movement has been designated and which has been moved by said ejection slot medium movement process from said ejection slot which is said physical slot of the movement destination back to said physical slot of the movement origin, and performs an update of exchanging said physical slot number of the movement origin and that of the movement destination in said physical slot number column of said logical library configuration information table;

said control unit moves said recording medium, in said physical library unit, correlated with said logical ejection slot in said designated logical library unit to said ejection slot; and said control unit performs an update of returning said changed correspondence relationship between said logical ejection slot and said recording medium, in said logical library configuration information table, back to its original state.

8. A non-transitory recording computer readable medium for storing a control program, which is used in a library device comprising:

at least an ejection slot which is shared by a plurality of external devices; a physical library unit which contains a plurality of physical recording media and is divided into a larger number of areas than the number of said ejection slots; logical library units each of which are logically correlated with each of said areas; a logical library information storage unit which stores connection information indicating a connection relationship between each of said logical library units and each of said external devices;

and a control unit which correlates the ejection slot with said logical library units when each of said physical recording media are ejected, which makes a computer execute:

a referring processing in which refers to said logical library information storage unit in response to a reception of an export process command from said external device; and an identifying processing in which identifies one of said logical library units which is correlated with a physical medium storage slot, which is stored a physical recording medium in said physical library unit having been ordered by said export process command to be ejected from said ejection slot;

a correlating processing in which correlates, in the identified logical library unit, said physical recording medium, which has been ordered to be ejected, to said ejection slot;

a designating processing which, in response to an input operation for designating said identified logical library unit to an operation unit, designates the identified logical library unit correlated with the physical recording medium to be ejected; and a moving processing which moves only the physical recording medium to be ejected to said ejection slot when the physical recording medium is extracted from said storage slot, wherein with respect to the logical ejection of said logical recording medium correlated to said physical recording medium whose ejection has been ordered by said export process command, said control unit acquires physical slot numbers representing movement origin and movement destination physical slots corresponding on a one-to-one basis to movement origin and movement destination logical slot numbers representing respectively original and destination logical slots of the movement, in case said physical recording medium is present in said physical slot, in said physical library unit, correlated to said physical slot number corresponding to said movement origin logical slot number and no said physical recording medium is present in said physical slot correlated to said physical slot number corresponding to said movement destination logical slot number:

if said movement destination logical slot number indicates said logical ejection slot, said control unit executes an ejection slot medium movement process of moving said physical recording medium to said ejection slot; and if said movement destination logical slot number does not indicate said logical ejection slot, said control unit moves said physical recording medium in said physical library unit to said physical slot of the movement destination, in response to designation made at said operation unit of said logical library unit to which said recording medium whose ejection has been ordered by said export process command is correlated, said control unit checks whether or not said logical ejection slot in said designated logical library unit is correlated to said ejection slot;

if said logical ejection slot is correlated to said ejection slot, said control unit does not execute the movement of said recording medium;

if said logical ejection slot is not correlated to said ejection slot, said control unit undoes the correlating, made by said ejection slot medium movement process, of said physical slot number corresponding to said logical slot number of said logical ejection slot with said ejection slot in said physical library, returns said recording medium whose movement has been designated and which has been moved by said ejection slot medium movement process from said ejection slot which is said physical slot of the movement destination back to said physical slot of the movement origin, and performs an update of exchanging said physical slot number of the movement origin and that of the movement destination in said physical slot number column of said logical library configuration information table;

said control unit moves said recording medium, in said physical library unit, correlated with said logical ejection slot in said designated logical library unit to said ejection slot; and said control unit performs an update of returning said changed correspondence relationship between said logical ejection slot and said recording medium, in said logical library configuration information table, back to its original state.

9. A library device control method which is used in a library device comprising:

at least an ejection slot which is shared by a plurality of external devices; a physical library unit which contains a plurality of physical recording media and is divided into a larger number of areas than the number of said ejection slots; logical library units each of which are logically correlated with each of said areas; a logical library information storage unit which stores connection information indicating a connection relationship between each of said logical library units and each of said external devices;

and a control unit which correlates the ejection slot with said logical library units when each of said physical recording media are ejected, comprising:

referring to said logical library information storage unit in response to a reception of an export process command from said external device; and identifying one of said logical library units which is correlated with a physical medium storage slot, which is stored recording medium in said physical library unit having been ordered by said export process command to be ejected from said ejection slot;

correlating, in the identified logical library unit, said physical recording medium, which has been ordered to be ejected, to said ejection slot;

in response to an input operation for designating said identified logical library unit to an operation unit, designating the identified logical library unit correlated with the physical recording medium to be ejected; and moving only the physical recording medium to be ejected to said ejection slot when the physical recording medium is extracted from said storage slot;

the library device comprising an ejection slot locking control unit which performs control to unlock a lock for opening said ejection slot, according to an ejection slot unlocking command of unlocking the lock received from said external device, and the library device comprising an ejection slot locking status table, in said logical library information storage unit, which shows a locked or unlocked state of the lock for opening said ejection slot, with respect to each of said logical library units, wherein:

on receiving said ejection slot unlocking command, said control unit identifies said logical library unit, among said logical library units, with respect to which said external device have ordered unlocking of the ejection slot;

referring to said ejection slot locking status information, said control unit checks whether or not there is any said logical library unit, other than said identified logical library unit, with respect to which said lock is in the unlocked state; and if there is no other said logical library unit in said unlocked state, said control unit updates said ejection slot locking status information such that said logical library unit being the target of said ejection slot unlocking command is put into the unlocked state, and also performs control to unlock said lock at said ejection slot.

10. A non-transitory recording computer readable medium for storing a control program, which is used in a library device comprising:

at least an ejection slot which is shared by a plurality of external devices; a physical library unit which contains a plurality of physical recording media and is divided into a larger number of areas than the number of said ejection slots; logical library units each of which are logically correlated with each of said areas; a logical library information storage unit which stores connection information indicating a connection relationship between each of said logical library units and each of said external devices;

and a control unit which correlates the ejection slot with said logical library units when each of said physical recording media are ejected, which makes a computer execute:

a referring processing in which refers to said logical library information storage unit in response to a reception of an export process command from said external device; and an identifying processing in which identifies one of said logical library units which is correlated with a physical medium storage slot, which is stored a physical recording medium in said physical library unit having been ordered by said export process command to be ejected from said ejection slot;

a correlating processing in which correlates, in the identified logical library unit, said physical recording medium, which has been ordered to be ejected, to said ejection slot;

a designating processing which, in response to an input operation for designating said identified logical library unit to an operation unit, designates the identified logical library unit correlated with the physical recording medium to be ejected; and a moving processing which moves only the physical recording medium to be ejected to said ejection slot when the physical recording medium is extracted from said storage slot, the library device comprising an ejection slot locking control unit which performs control to unlock a lock for opening said ejection slot, according to an ejection slot unlocking command of unlocking the lock received from said external device, and the library device comprising an ejection slot locking status table, in said logical library information storage unit, which shows a locked or unlocked state of the lock for opening said ejection slot, with respect to each of said logical library units, wherein:

on receiving said ejection slot unlocking command, said control unit identifies said logical library unit, among said logical library units, with respect to which said external device have ordered unlocking of the ejection slot;

referring to said ejection slot locking status information, said control unit checks whether or not there is any said logical library unit, other than said identified logical library unit, with respect to which said lock is in the unlocked state; and if there is no other said logical library unit in said unlocked state, said control unit updates said ejection slot locking status information such that said logical library unit being the target of said ejection slot unlocking command is put into the unlocked state, and also performs control to unlock said lock at said ejection slot.

* * * * *